(12) United States Patent
Kumetani

(10) Patent No.: US 10,726,094 B2
(45) Date of Patent: Jul. 28, 2020

(54) CONTENT DISTRIBUTION SYSTEM

(71) Applicant: SHARP KABUSHIKI KAISHA, Sakai, Osaka (JP)

(72) Inventor: Kohji Kumetani, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 52 days.

(21) Appl. No.: 16/107,159

(22) Filed: Aug. 21, 2018

(65) Prior Publication Data
US 2019/0065617 A1 Feb. 28, 2019

(30) Foreign Application Priority Data
Aug. 24, 2017 (JP) .................. 2017-161405

(51) Int. Cl.
| | |
|---|---|
| G06F 16/957 | (2019.01) |
| G06Q 30/02 | (2012.01) |
| G06F 11/32 | (2006.01) |
| H04L 29/08 | (2006.01) |

(52) U.S. Cl.
CPC ........ *G06F 16/9574* (2019.01); *G06F 11/327* (2013.01); *G06Q 30/0241* (2013.01); *H04L 29/08801* (2013.01); *H04L 67/2842* (2013.01)

(58) Field of Classification Search
CPC . H04L 29/08801–0881; H04L 29/0809; H04L 67/2842–2847; G06F 16/95; G06F 16/957–9577; G06F 11/324–328; G06Q 30/0241; G06Q 30/0277; G09F 27/00
See application file for complete search history.

(56) References Cited

U.S. PATENT DOCUMENTS

| | | | | |
|---|---|---|---|---|
| 9,607,322 | B1* | 3/2017 | Boynes | G06Q 30/0277 |
| 9,626,344 | B1* | 4/2017 | Boynes | G06F 17/2247 |
| 2004/0268400 | A1* | 12/2004 | Barde | H04N 7/17318 725/94 |
| 2009/0044234 | A1* | 2/2009 | Lee | H04N 7/17318 725/87 |
| 2010/0199311 | A1* | 8/2010 | Chang | H04N 21/4384 725/46 |
| 2011/0296047 | A1* | 12/2011 | Orr | G11B 20/10527 709/231 |
| 2015/0154659 | A1* | 6/2015 | Harrison | G06Q 30/0277 705/14.73 |
| 2017/0187822 | A1* | 6/2017 | Thomee | G06F 16/95 |

FOREIGN PATENT DOCUMENTS

JP 2015-035038 2/2015

\* cited by examiner

*Primary Examiner* — Brendan Y Higa
(74) *Attorney, Agent, or Firm* — ScienBiziP, P.C.

(57) ABSTRACT

A content distribution system includes: a server device that distributes a content; a display device capable of displaying the content; and a display control device that controls display of the content received from the server device on the display device, in which, in a case where the display control device receives the content from the server device, the display device displays an alternative content.

6 Claims, 18 Drawing Sheets

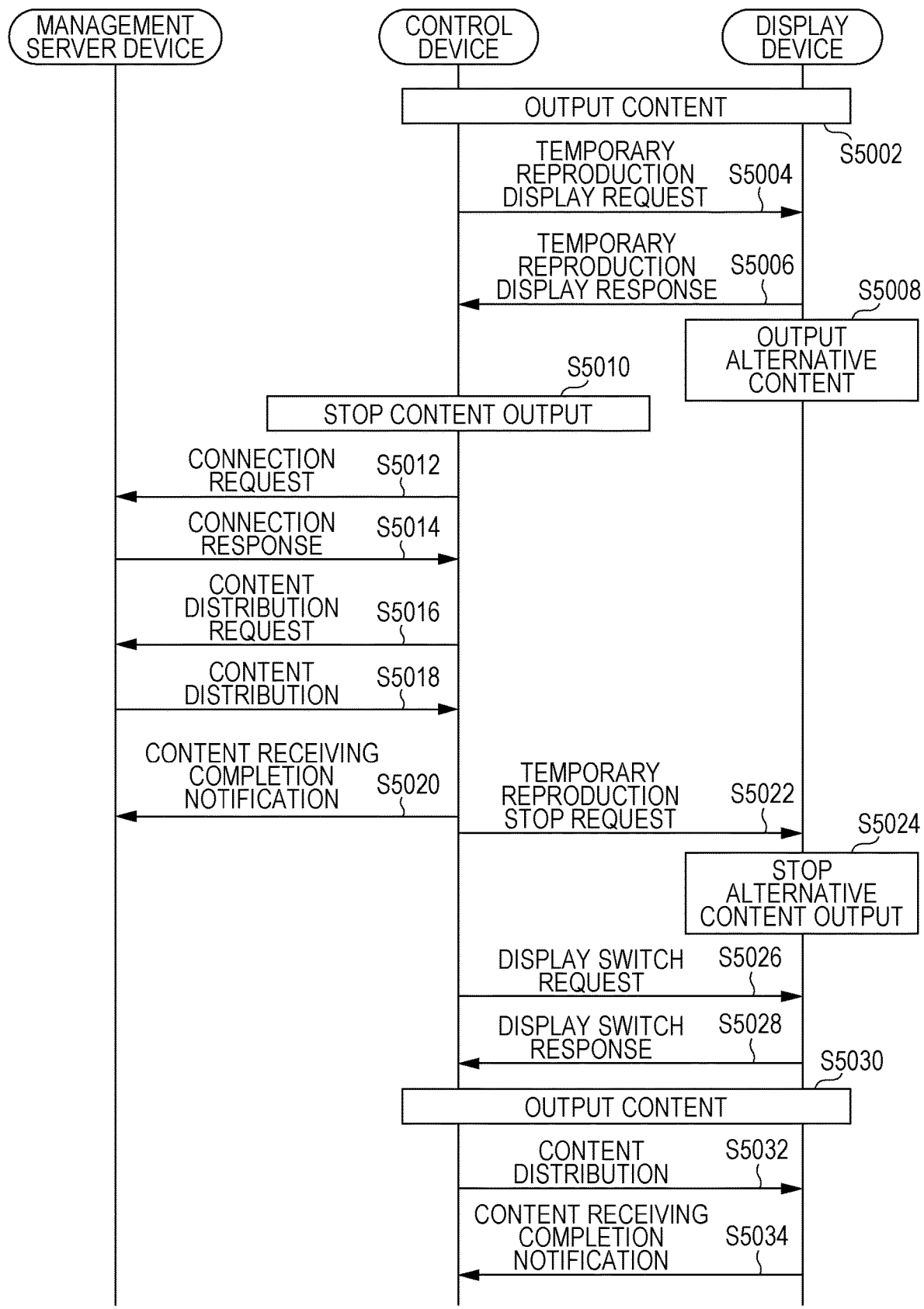

CONTENT DISTRIBUTION SYSTEM

BACKGROUND

1. Field

The present disclosure relates to a content distribution system.

2. Description of the Related Art

In recent years, so-called digital signage has been spread as a content display device which displays contents such as advertisements on a display device by disposing the display device at a place where there are many people such as premises of a station or a shopping center (see, for example, Japanese Unexamined Patent Application Publication No. 2015-35038).

In general, in the digital signage, after the display device is installed, by receiving distribution of the content from a server which manages the display device, the distributed content is displayed on the display device.

In addition, various methods are devised so that the content is appropriately displayed by the digital signage device. For example, Japanese Unexamined Patent Application Publication No. 2015-35038 discloses a technique of an image display device including a network I/F for obtaining web content data via a network and an external memory I/F which is configured to be connectable to an external memory for storing the web content data and which obtains the web content data from the connected external memory. The image display device further includes a web content selecting unit which selects one of the web content data obtained via the network I/F and the web content data obtained via the external memory I/F, a web browser which interprets and draws the web content data selected by the web content selecting unit, and a display panel which is a display unit for displaying the data drawn by the web browser. Thus, an image is continuously displayed even in a case where an error occurs in the network.

In a content distribution system used for the digital signage described above, when receiving distribution of the content while the display device displays the content, the number of jobs to be processed by the display device may increase, a content display may be distorted, and a malfunction of the display such as a display stop may occur.

In particular, if reading and writing of a video content file generally having a large amount of data are performed at the same time, there is a possibility that a content display may be distorted and a malfunction of the display such as a display stop occurs. When the malfunction for which a quality as digital signage may not be maintained occurs, there is a problem that reliability of the digital signage is damaged.

In view of the above description, the present disclosure provides a content display device or the like capable of maintaining a quality of a displayed content while a content is being received.

SUMMARY

According to an aspect of the disclosure, there is provided a content distribution system including: a server device that distributes a content; a display device capable of displaying the content; and a display control device that controls display of the content received from the server device on the display device, in which the server device includes a display request transmitting unit which transmits a display request to the display device in a case of distributing the content to the display control device, and a content distribution unit which distributes the content to the display control device after transmitting the display request, and the display device includes an alternative content storage unit which stores an alternative content to be displayed instead of the content, and an alternative content display unit which displays the alternative content in a case of receiving the display request from the server device.

According to another aspect of the disclosure, there is provided a content distribution system including: a server device that distributes a content; a display device capable of displaying the content; and a display control device that controls display of the content received from the server device on the display device, in which the display control device includes a display request transmitting unit which transmits a display request to the display device in a case of receiving the content from the server device, and a content receiving unit which receives the content from the server device after transmitting the display request, and the display device includes an alternative content storage unit which stores an alternative content to be displayed instead of the content, and an alternative content display unit which displays the alternative content in a case of receiving the display request from the display control device.

According to still another aspect of the disclosure, there is provided a content distribution system including: a server device that distributes a first content; and a display control device that controls display of the first content on a display device, in which the display device is capable of displaying a second content stored in advance, and in a case where the server device distributes the first content to the display control device, the display device displays the second content.

BRIEF DESCRIPTION OF THE DRAWINGS

FIG. 19 is a sequence diagram of a management server device, a control device, and a display device according to a fifth embodiment.

DESCRIPTION OF THE EMBODIMENTS

Hereinafter, embodiments according to the present disclosure will be described with reference to the drawings. In the present embodiment, as an example of a content display system including a content display device according to the present disclosure, a signage system will be described.

1. First Embodiment

1.1 Overall Configuration

Figure 1:
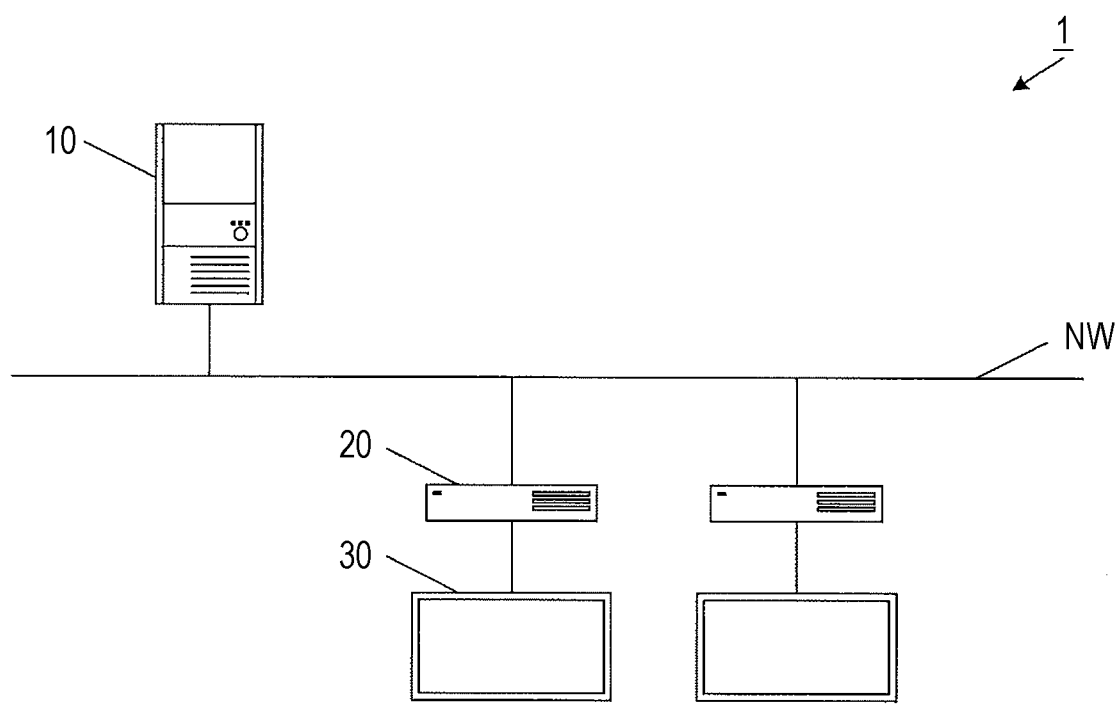
FIG. 1 is a diagram for explaining an outline of a signage system according to a first embodiment.

First, an overall configuration of a signage system 1 according to the present embodiment will be described based on FIG. 1. As illustrated in FIG. 1, in the signage system 1, a control device 20 and a display device 30 are connected to a management server device 10 via a network NW.

In FIG. 1, the management server device 10, the control device 20, and the display device 30 are connected with the same network via a local area network (LAN), but the management server device 10, the control device 20, and the display device 30 may have another connection configuration. For example, the management server device 10, the control device 20, and the display device 30 may be connected with one another via an external network such as the internet or the like. In addition, instead of the LAN, the management server device 10, the control device 20, and the display device 30 may be connected with one another via another communicating unit (for example, a serial interface such as RS-232C).

The management server device 10 is a content management server which manages and distributes contents to be distributed to the control device 20 and the display device 30. The management server device 10 may be used by a person who wants to distribute the contents, such as an administrator, an advertiser, and the like of the signage system.

The control device 20 is a device which causes the display device 30 to output the content received from the management server device 10 as a video signal. Further, the display device 30 is a device which outputs the content. One or a plurality of control devices 20 and display devices 30 may be connected to the network.

1.2 Description of Concept of Embodiment

Figure 2:
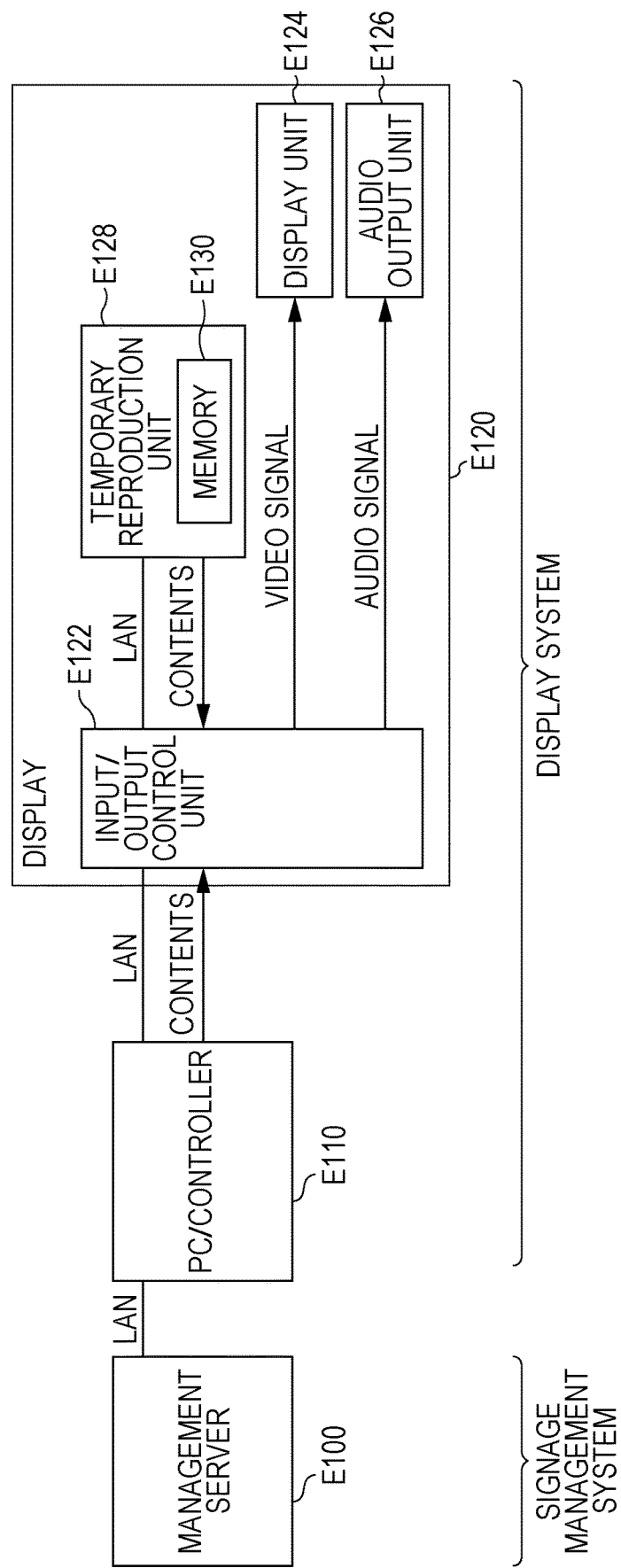
FIG. 2 is a diagram for explaining a basic concept in the first embodiment.

First, a basic concept of the present embodiment will be described based on FIG. 2. FIG. 2 illustrates a state in which a management server E100 on which signage software for a host is operated, a PC/controller E110 on which signage software for a client is operated, and a display E120 are connected. Here, the management server E100 may be referred to as a signage management system and a system including the PC/controller E110 and the display E120 may be referred to as a display system.

The management server E100 manages the content displayed by the display system and distributes the content. In addition, the PC/controller E110 is a device which outputs the video signal based on the content distributed from the management server E100. The PC/controller E110 may use a personal computer (PC) as a control device or may use a controller specialized in a display function as a control device.

Further, the PC/controller E110 and the display E120 are connected by a system such as a high-definition multimedia interface (HDMI) (registered trademark), a composite, a display port, a USB, or the like.

The display E120 includes an input/output control unit E122, a display unit E124, an audio output unit E126, and a temporary reproduction unit E128. The temporary reproduction unit E128 further includes a memory E130. In addition, the content (video content) output from the PC/controller E110 and the content output from the temporary reproduction unit E128 are input to the input/output control unit E122.

Here, the content (first content) output from the PC/controller E110 is a content normally output from the display unit E124 and the audio output unit E126. Generally, the content is associated with schedule data. For example, the content is associated with schedule information on a schedule such as output time or the number of times being output, program information on a display frame, or the like. Then, according to the schedule data, the content is displayed.

On the other hand, the content (second content) output from the temporary reproduction unit E128 is a content not associated with the schedule data described above. That is, the content is a content which may be output regardless of a content stored in the schedule data. In the present disclosure, the content may be referred to as an alternative content.

The temporary reproduction unit E128 is a functional unit which outputs the content stored in the memory E130. In addition, the temporary reproduction unit E128 is connected to the input/output control unit E122 via the LAN and may be connected with an external device via the input/output control unit E122 by the LAN. As a result, the temporary reproduction unit E128 may receive information such as control information from the external device and may store the content distributed from the external device in the memory E130.

The temporary reproduction unit E128 may be a function unit built in the display E120 or may be a function added by an expansion board or the like. Further, the temporary reproduction unit E128 may be realized by a reproduction device connected via an input/output IF or software.

The input/output control unit E122 is a functional unit which performs control for selecting and outputting one content among the content input from the PC/controller E110 and the content input from the temporary reproduction unit E128. In the present embodiment, a video signal and an audio signal are separated from the content, the video signal is output to the display unit E124 and the audio signal is output to the audio output unit E126. The video signal and the audio signal may be directly input to the input/output control unit E122.

In addition, the input/output control unit E122 receives a control signal from outside via the LAN. Eased on the received control signal, one of the content output from the PC/controller E110 and the content (alternative content) output from the temporary reproduction unit E128 is selected.

With such a configuration, the display E120 may select one of the content from the PC/controller E110 and the content from the temporary reproduction unit E128 and output the content from the display unit E124 and the audio output unit E126.

1.3 Functional Configuration

Next, functional configurations of the management server device 10, the control device 20, and the display device 30 will be described.

1.3.1 Management Server Device

Figure 3:
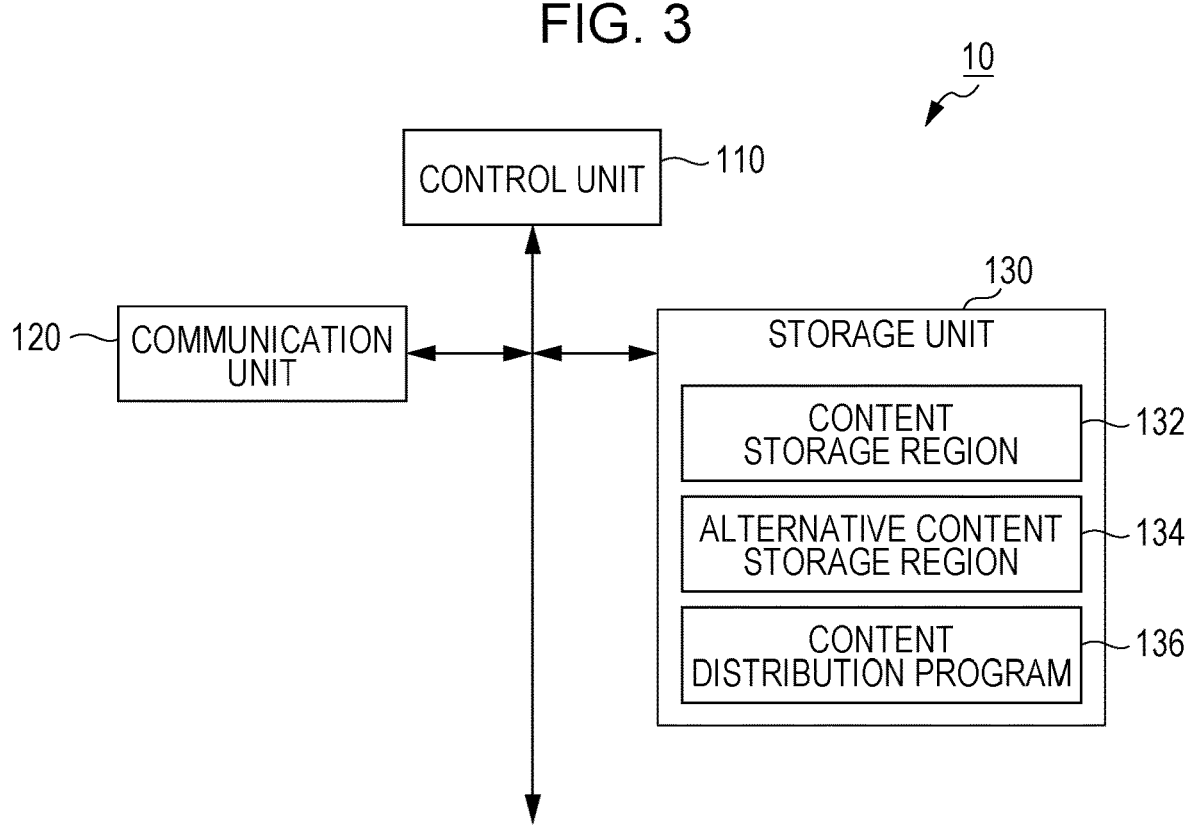
FIG. 3 is a diagram for explaining a functional configuration of a management server device according to the first embodiment.

The management server device 10 will be described with reference to FIG. 3. The management server device 10 is configured to include a control unit 110, a communication unit 120, and a storage unit 130.

The control unit 110 is a functional unit for controlling the overall management server device 10. The control unit 110 realizes various kinds of functions by reading and executing various kinds of programs stored in the storage unit 130 and is configured by, for example, a central processing unit (CPU).

The communication unit 120 is a functional unit which communicates with the control device 20 and the display device 30 which are other devices. For example, the communication unit 120 is a functional unit capable of communicating a wired LAN or a functional unit capable of communicating by a wireless LAN. As a communication scheme, Ethernet (registered trademark) or IEEE 802.11a/b/g/n may be used.

The storage unit 130 is a functional unit which stores various kinds of programs or various data desired for operation of the management server device 10. The storage unit 130 is configured with, for example, a sold state drive (SSD) which is a semiconductor memory, a hard disk drive (HDD), and the like.

Here, the storage unit 130 secures a content storage region 132 in which the content is stored as the first content and an alternative content storage region 134 in which the alternative content is stored as the second content. Further, a content distribution program 136 is stored as a program.

In the content storage region 132, contents such as advertisements to be distributed to the control device 20 are stored. In addition, the content may include display information related to schedule data or another display.

In the alternative content storage region 134, contents such as advertisements to be distributed to the display device 30 are stored. In addition, the alternative content may include display information related to schedule data or another display.

Here, the content is data which may be displayed and output on the display device 30 and is, for example, a video, a still image, a text, an audio, or the like. The video includes not only a file represented by an mpg file, a wmv file, an avi file, a flash file, or the like but also a dynamic content represented by HTML 5. The still image includes not only a still image file such as jpg, gif, PNG but also a content such as a portable document format (PDF) and an HTML file. Further, the content includes a text string (text file) represented by text (letter, symbol, number, or the like) and these output based on an audio (for example, mp3, wav, or the like) file.

In addition, the schedule data may designate a date, a time, a day of the week, and the like at which the content described above is displayed on the display device 30. Further, the display information is display information related to a program configured with the content and includes, for example, information related to a time period (for example, specifying to display the content for X seconds per content) during which the content is displayed or a display layout.

By reading and executing the content distribution program 136, the control unit 110 realizes a content distribution function.

1.3.2 Control Device

Figure 4:
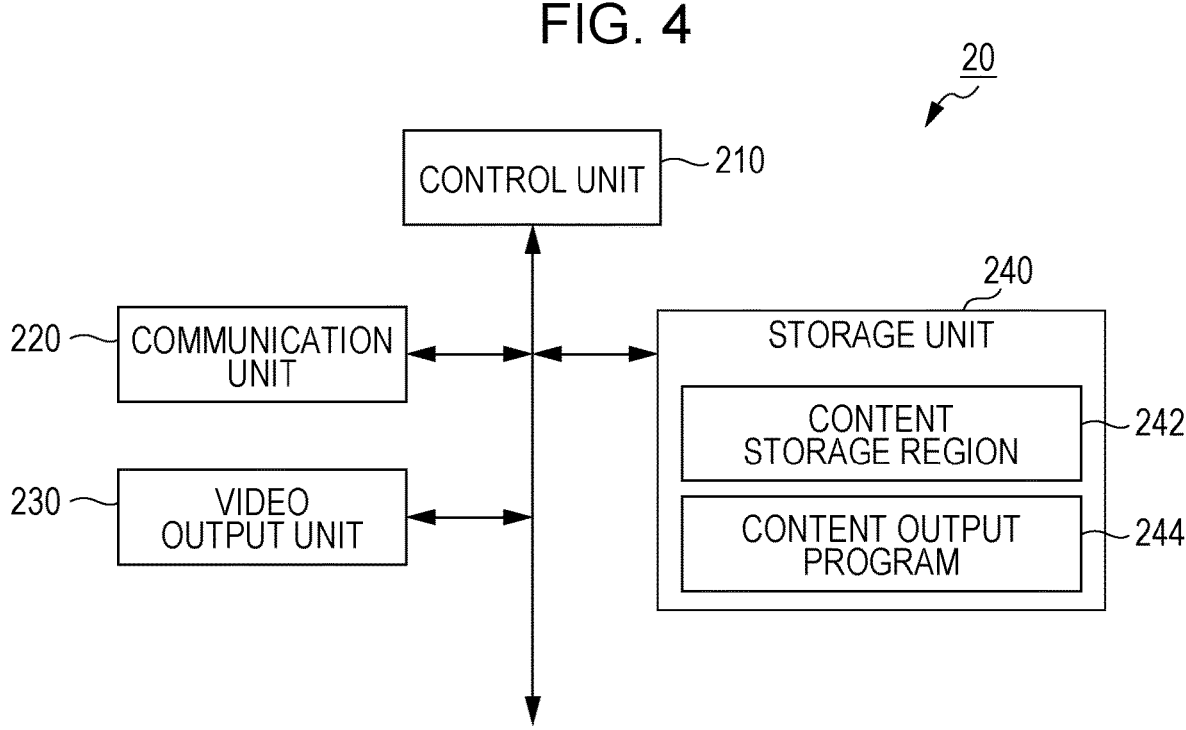
FIG. 4 is a diagram for explaining a functional configuration of a control device according to the first embodiment.

The control device 20 will be described with reference to FIG. 4. The control device 20 is configured to include a control unit 210, a communication unit 220, a video output unit 230, and a storage unit 240.

The control unit 210 is a functional unit which controls the overall control device 20. The control unit 210 realizes various kinds of functions by reading and executing various kinds of programs stored in the storage unit 240 and is configured by, for example, a central processing unit (CPU).

The communication unit 220 is a functional unit which communicates with another device. For example, the communication unit 220 is a functional unit capable of communicating by a wired LAN or a functional unit capable of communicating by a wireless LAN. As a communication scheme, Ethernet (registered trademark) or IEEE 802.11a/b/g/n may be used. In the present embodiment, the communication unit 220 is used for distributing the content or transmitting a control signal to the control device 20 or the display device 30 and receiving a response signal.

The video output unit 230 is a functional unit which reads content stored in a content storage region 242 described below and outputs the content to the display device 30. The display device 30 is connected by any method such as an HDMI, a composite, a display port, a USB Type C, or the like, for example. In addition, the video signal and the audio signal may be separately connected, such as in a case of being connected by the composite.

The storage unit 240 is a functional unit which stores various kinds of programs or various data desired for operation of the control device 20. The storage unit 240 is configured with, for example, an SSD which is a semiconductor memory, a hard disk drive (HDD), and the like.

Here, the storage unit 240 secures the content storage region 242 in which the content is stored. Further, a content output program 244 is stored.

The content storage region 242 stores the content (first content) such as advertisements to be distributed from the management server device 10. By reading and executing the content output program 244, the control unit 210 realizes a content output function.

1.3.3 Display Device

Figure 5:
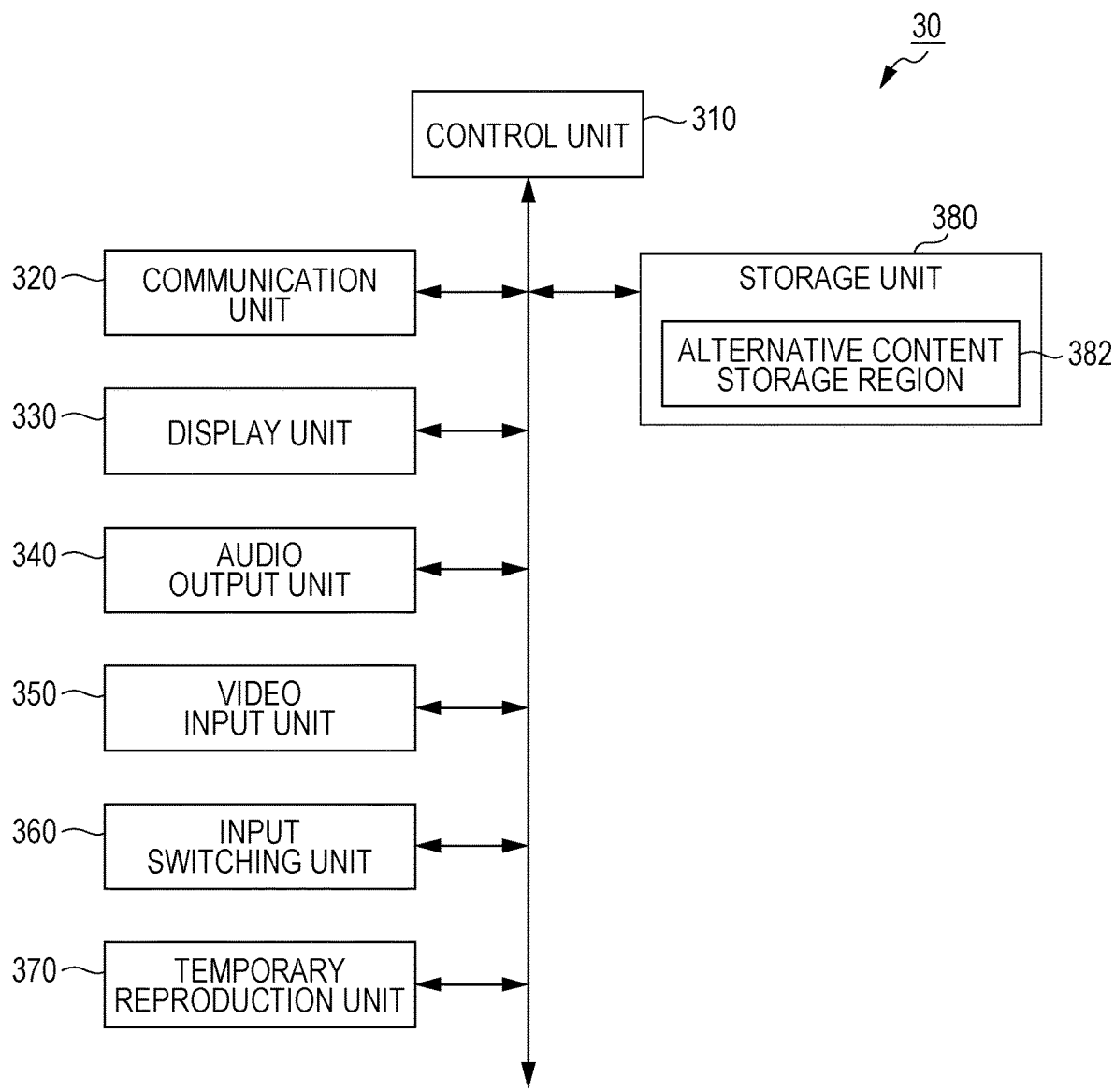
FIG. 5 is a diagram for explaining a functional configuration of a display device according to the first embodiment.

The display device 30 will be described with reference to FIG. 5. The display device 30 is configured to include a control unit 310, a communication unit 320, a display unit 330, an audio output unit 340, a video input unit 350, an input switching unit 360, a temporary reproduction unit 370, and a storage unit 380.

A control unit 310 is a functional unit for controlling the overall display device 30 and is configured with, for example, a central processing unit (CPU) and the like.

The communication unit 320 is a functional unit which communicates with another device. For example, the communication unit 120 is a functional unit capable of communicating by a wired LAN or a functional unit capable of communicating by a wireless LAN. As a communication scheme, Ethernet (registered trademark) or IEEE 802.11a/b/g/n may be used. In the present embodiment, the communication unit 320 is used for receiving the content or receiving a control signal and transmitting a response signal.

The display unit 330 is a functional unit which displays the content. The display unit 330 is configured with, for example, a display device such as a liquid crystal display (LCD) or an organic EL (OLED) display or an irradiation device such as a projector.

The audio output unit 340 is a functional unit which outputs an audio included in the content. The audio output unit 340 is configured with, for example, a speaker.

The video input unit 350 is a functional unit which inputs the content output from an external device or the like, to the display device 30. In the present embodiment, the content output from the control device 20 is input. The display device 30 is connected by any method such as an HDMI, a composite, a display port, a USB Type C, or the like, for example.

The input switching unit 360 is a functional unit which outputs the content by switching the input content. In the present embodiment, the content output from the video input unit 350 is input and the content output from the temporary reproduction unit 370 described below is input. Then, the content is switched to one of the contents and is output. Here, the video signal and the audio signal are extracted from the content. The video signal is output to the display unit 330 and the audio signal is output to the audio output unit 340.

The temporary reproduction unit 370 is a functional unit which reads the alternative content stored in an alternative content storage region 382 described below and outputs the read alternative content to the input switching unit 360.

The temporary reproduction unit 370 may be a temporary reproduction function which the display device 30 has in advance or may be a reproduction function expanded afterwards. In a case of the reproduction function expanded afterwards, for example, a dedicated expansion board may be mounted on the temporary reproduction unit 370 or the temporary reproduction unit 370 may be realized by a temporary reproduction device connected to an HDMI or a USB. As the temporary reproduction device, a device mounted with an OS such as Android, iOS, Windows Embedded, and TRON may have a reproduction function or a device mounted with a dedicated application may have the reproduction function.

For example, by connecting USB memory or an SD card in which contents are stored, the temporary reproduction function may display the stored content.

Here, the temporary reproduction means that an operation and a function in reproduction are limited as compared with normal reproduction of the content. For example, as compared with the reproduction of a normal content, the temporary reproduction function means a function capable of playing a content with low capacity or a content with low bit rate. In addition, in some cases, a reproducible format is also limited as compared with the normal reproduction.

In the present embodiment, the temporary reproduction is described as an example, but along with future technological innovation and cost reduction, the same (that is, content having the same file size or bit rate as normal content) as the normal reproduction function may be provided.

The storage unit 380 is a functional unit which stores various kinds of programs or various data desired for operation of the display device 30. The storage unit 380 is configured with, for example, a semiconductor memory (SSD), a hard disk drive (HDD), and the like.

Here, the storage unit 380 secures the alternative content storage region 382 in which the alternative content is stored. The alternative content storage region 382 stores the alternative content (second content) distributed from the management server device 10.

1.4 Flow of Process

Next, processes according to the present embodiment will be described with reference to the drawings. A sequence diagram and an operation flow described in the present embodiment are merely examples and an order and the like of the processes may be changed within a range in which operations are not affected.

1.4.1 Overall Flow

Figure 6:
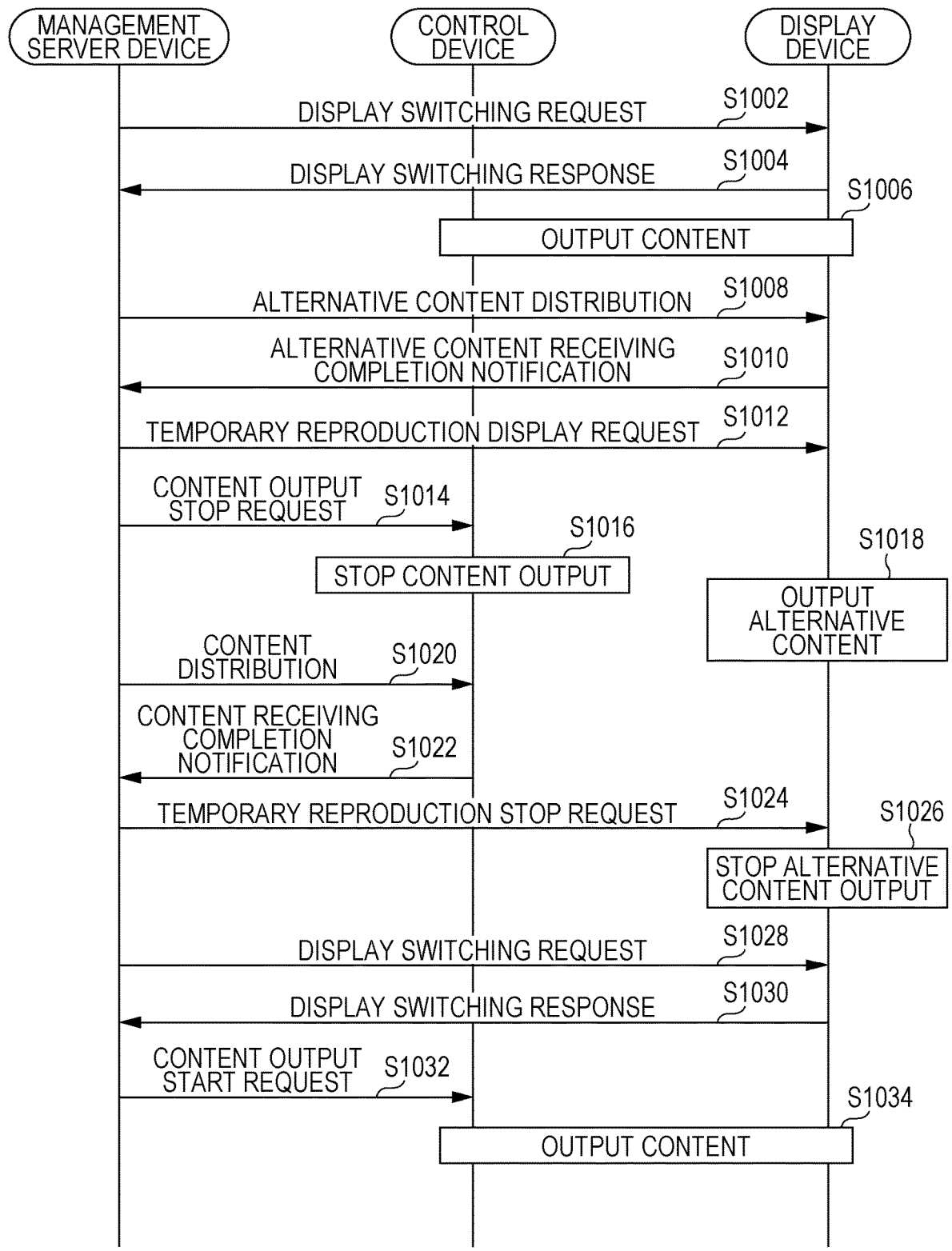
FIG. 6 is a sequence diagram of the management server device, the control device, and the display device according to the first embodiment.

FIG. 6 is a sequence diagram illustrating an overall flow of the management server device 10, the control device 20, and the display device 30. First, the management server device 10 transmits a display switching request to the display device 30 (S1002). The display switching of the display device 30 means that the control device 20 controls the display device 30 to switch an output of the normal content from the control device 20 into an output of the alternative content from the display device 30 by the temporary reproduction function.

By switching the content to be input, the display switching request displays the content output from a switching destination device or the like. For example, a command for switching the content is executed or an IP packet including the display switching request is transmitted from the management server device 10 to the display device 30. Any method other than the method may be used as long as the request may be transmitted from the management server device 10 to the display device 30.

Next, after receiving the display switching request, the display device 30 transmits a display switching response to the management server device 10 (S1004). For example, in a case where the display switching request is appropriately received in step S1002, the reception is responded.

As the display switching response, a return value for the executed command may be returned or the internet protocol (IP) packet including prescribed data may be transmitted from the display device 30 to the management server device 10. Any method other than the method may be used as long as it is possible to transmit a response to the request from the display device 30 to the management server device 10.

By receiving the display switching response, the management server device 10 may detect that a display switch is ordinarily performed.

In the present embodiment, by ordinarily performing the display switch, the display device 30 outputs the content output from the control device 20 (S1006). A state in which the display device 30 outputs the content output from the control device 20, that is, a state in which the first content is received from the control device 20 and is displayed is referred to as a content output mode.

In a case where the content is not input from the control device 20 and the display switch is not performed, the return value or data indicating that the display switch is not performed may be transmitted from the display device 30 to the management server device 10 or the display switching response may not be transmitted. By not receiving the normal display switching response, the management server device 10 may detect that the display switch is not ordinarily performed.

In a case where the management server device 10 determines that the display switch is ordinarily performed and the content is output from the control device 20 by receiving the display switching response, the management server device 10 distributes the alternative content to the display device 30 (S1008). The alternative content is distributed by transmitting the alternative content stored in the alternative content storage region 134 of the management server device 10 to the display device 30 via the network.

In addition, in a case where a reception of the alternative content is completed, the display device 30 transmits an alternative content receiving completion notification to the management server device 10 (S1010).

Here, "reception of content is completed" in the present embodiment means a state in which each of the devices may ordinarily use the content (alternative content). Specifically, at a timing when each of the devices (here, display device 30) determines that the reception of the alternative content is completed, the following cases are conceivable.

A timing when the normal alternative content is stored in the alternative content storage region 382 of the display device 30.

A timing when validity of the content received from the management server device 10 is confirmed.

A timing when in a case where the compressed content is distributed from the management server device 10, the content is developed.

The timing when it is determined that the reception of the content is completed is not limited to the display device 30 and is the same timing of the control device 20.

In addition, although the alternative content receiving completion notification is described as being transmitted in a case where the alternative content is ordinarily received, in a case where the alternate content is not ordinarily transmitted, a signal including information indicating that the alternate content is not ordinarily transmitted may be transmitted.

In a case of receiving the alternative content receiving completion notification, the alternative content is ordinarily distributed, so that the management server device 10 transmits a temporary reproduction display request to the display device 30 (S1012). In addition, the management server device 10 transmits a content output stop request to the control device 20 (S1014).

For the signal, the notification, the request, and the like, a command may be executed or an internet protocol (IF) packet including prescribed data may be transmitted. Further, any other method may be used as long as other requests can be transmitted.

When receiving the content output stop request, the control device 20 stops reading the content stored in the content storage region 242 and stops the output (S1016). In addition, when the display device 30 receives the temporary reproduction display request (S1012), the temporary reproduction unit 370 outputs the alternative content to the input switching unit 360. The input switching unit 360 outputs the video signal to the display unit 330 and outputs the audio signal to the audio output unit 340 based on the alternative content output from the temporary reproduction unit 370 (S1018). A state in which the display device 30 outputs the content output from the temporary reproduction unit 370, that is, a state in which the alternative content is output is referred to as a temporary reproduction mode.

Next, the management server device 10 distributes the contents to the control device 20 (S1020). The content is distributed by transmitting the content stored in the content storage region 132 of the management server device 10 to the control device 20 via the network.

In addition, in a case where the reception of the content is completed, the control device 20 transmits a content receiving completion notification to the management server device 10 (S1022).

In a case where the content is ordinarily distributed to the control device 20 (distribution of content is completed), the management server device 10 switches the current temporary reproduction (output of alternative content in display device 30) into the reproduction of the content in the control device 20 (output of content in control device 20).

In this case, the management server device 10 transmits the display switching request to the display device 30. In this case, a temporary reproduction stop request is transmitted as a display switching request (S1024).

Since the display device 30 receives the temporary reproduction stop request, the temporary reproduction unit 370 stops outputting the alternative content stored in the alternative content storage region 382 (S1026).

Next, the management server device 10 transmits the display switching request to the display device 30 (S1028). The display device 30 transmits the display switching response to the management server device 10 (S1030). The display switching request and the display switching response are the same as in S1002 and S1004.

In addition, a content output request is transmitted to the control device 20 (S1032). According to the request, the control device 20 starts reading the content stored in the content storage region 242 and starts outputting the read content. The display device 30 displays the content stored in the control device 20 (S1034).

In the sequence described above, in order to set the temporary reproduction mode, the management server device 10 transmits two request of the temporary reproduction stop request (S1024) and the display switching request (S1028), but the management server device 10 may transmit one request obtained by combining the two requests for the temporary reproduction mode.

1.4.2 Content Distribution Process

Next, a flow of a content distribution process which is a main process of the management server device 10 will be described with reference to FIGS. 7 and 8. The content distribution process of the management server device 10 is a process realized by the control unit 110 reading the content distribution program 136 from the storage unit 130 and executing the content distribution program 136.

First, the contents and the alternative contents are stored (step S102). Specifically, for example, the administrator of the signage system stores the content received from an advertiser or the like, in the content storage region 132 and stores the alternative content prepared in advance in the alternative content storage region 134.

Next, it is determined whether or not the content not distributed to the control device 20 (undistributed content) exists in the contents and the alternative contents stored in step S102 (step S104). In a case where the undistributed content exists (Yes in step S104), the management server device 10 distributes the content.

In order to distribute the content, the management server device 10 transmits the display switching request to the display device 30 at first (step S106). Next, it is determined whether or not the display switching response is received from the display device 30 (step S108). Here, in a case where the display switching response is not received within a prescribed time period and a timeout occurs or a case where it is detected that the display switching response is not received and the display switch is not ordinarily performed, the distribution of the content is stopped. After a prescribed time period elapses, the distribution process of the content may be performed again.

In a case where the display switching response is received from the display device 30 (Yes in step S108), since the display device 30 is at a state in which the content output from the control device 20 is displayed, the management server device 10 distributes the alternative content to the display device 30 (step S110).

Next, it is determined whether or not the alternative content receiving completion notification is received from the display device 30 (step S112). In a case of receiving the alternative content receiving completion notification, the temporary reproduction display request is transmitted to the display device 30, so that the distributed alternative content is displayed on the display device 30 (Yes in step S112→step S114). By calculating a reception time from the amount of data, a used line speed, and transmission efficiency of the distributed content, in a case where the alternative content receiving completion notification is not received within the reception time or a case where the management server device 10 detects that the distribution is not ordinarily performed, the alternative content may be distributed again.

After the display device 30 is at a state in which the alternative content is displayed, the management server device 10 subsequently distributes the content to the control device 20. First, the content output stop request is transmitted (step S116) and the control device 20 stops reading and outputting the content. According to the process, without executing processes undesired for receiving the content, the control device 20 may efficiently distribute the content. In a case where it takes a long time to stop the output of the content or a restart the output of the content, the content output stop request may not be performed. In this case, the control device 20 receives the content while outputting the content.

Next, the content is distributed to the control device 20 (step S118). Further, it is determined whether or not the content receiving completion notification is received (step S120). Specifically, the same process may be executed in step S110 and step S112.

When the distribution of the content to the control device 20 is completed, the temporary reproduction stop request is transmitted to the display device 30 (step S122 in FIG. 8) and the display switching request is further transmitted to the display device 30 (step S124). When receiving the display switching response from the display device 30, a content output start request is transmitted to the control device 20 (Yes in step S126→step S128). According to these processes, the mode is switched into the content output mode.

Next, it is determined whether or not an end operation is performed (step S130). The end operation may be an operation of turning off a power supply or may be an operation of ending the program. In a case of the end operation, the process is ended (Yes in step S130). In a case where the end operation is not performed, the process returns to step S102 (No in step S130→step S102).

1.4.3 Main Process of Control Device

Next, a flow of a main process of the control device 20 will be described with reference to FIG. 9. The main process of the control device is realized by the control unit 210 reading the content output program 244 from the storage unit 240 and executing the content output program 244.

First, it is determined whether or not the content output stop request is received from the management server device 10 (step S202). When receiving the content output stop request (Yes in step S202), the output of the content is stopped (step S204).

Next, it is determined whether or not the content is distributed from the management server device 10 (step S206). When the content is distributed, the distributed content is received and is stored in the content storage region 242 (Yes in step S206→step S208).

When completing the reception and the storage of the content, the content receiving completion notification is transmitted to the management server device 10 (step S210).

Next, it is determined whether or not the content output start request is received from the management server device 10 (step S212). When receiving the content output start request (Yes in step S212), the output of the content is started (step S214).

Next, it is determined whether or not the end operation is performed (step S216). The end operation may be an operation of turning off a power supply or may be an operation of ending the program. In a case of the end operation, the process is ended (Yes in step S216). In a case where the end operation is not performed, the process returns to step S202 (No in step S216→step S202).

1.4.4 Main Process of Display Device

Next, a flow of a main process of the display device 30 be described with reference to FIG. 10. The main process of the display device is realized by the control unit 310 controlling and executing each of the functional units of the display device 30.

First, the video and audio to be output are switched into the content input from the control device 20 (step S302). That is, by controlling the input switching unit 360, the video signal extracted from the content is output to the display unit 330 and the audio signal extracted from the content is output to the audio output unit 340.

Next, it is determined whether or not the temporary reproduction stop request is received (step S304). When receiving the temporary reproduction stop request (Yes in step S304), the output of the alternative content by the temporary reproduction unit 370 is stopped (step S306).

Next, it is determined whether or not the alternative content is distributed from the management server device 10 (step S308). When the alternative content is distributed, the distributed alternative content is received and is stored in the alternative content storage region 382 (Yes in step S308→step S310). When completing the reception and the storage of the alternative content, the alternative content receiving completion notification is transmitted to the management server device 10 (step S312).

Next, it is determined whether or not the temporary reproduction display request is received from the management server device 10 (step S314). When receiving the temporary reproduction display request, the output of the content by the temporary reproduction unit 370 is started (Yes in step S314→step S316). That is, the temporary reproduction unit 370 reads and outputs the alternative content stored in the alternative content storage region 382.

In addition, the input switching unit 360 switches the input to output the video signal to the display unit 330 and to output the audio signal to the audio output unit 340 based on the content output from the temporary reproduction unit 370 (step S318).

Next, it is determined whether or not the display switching request is received from the management server device 10 (step S320). When receiving the display switching request, the input switching unit 360 switches the input to output the content output from the control device and input to the video input unit 350 (step S322).

Next, it is determined whether or not the end operation is performed (step S214). The end operation may be an operation of turning off a power supply or may be an operation of ending the program. In a case of the end operation, the process is ended (Yes in step S214). In a case where the end operation is not performed, the process returns to step S202 (No in step S214→step S202).

In this way, according to the present embodiment, while the content is updated by the control device 20 receiving the first content from the management server device 10 which is the content management server, the temporary reproduction unit 370 displays the alternative content which is the second content on the display device 30. Accordingly, it is possible to avoid an occurrence of a malfunction such as a distortion in the video display based on the content.

2. Second Embodiment

Next, the second embodiment according to the present disclosure will be described with reference to FIGS. 11 to 16. The second embodiment has the same configuration as the first embodiment, but the second embodiment has a different method of distributing the content. That is, the first embodiment has a PUSH distribution of transmitting the content from the management server device 10 to the control device 20 or the display device 30, but the second embodiment has a PULL distribution of requesting the content distribution from the control device 20 or the display device 30 to the management server device 10.

Figure 7:
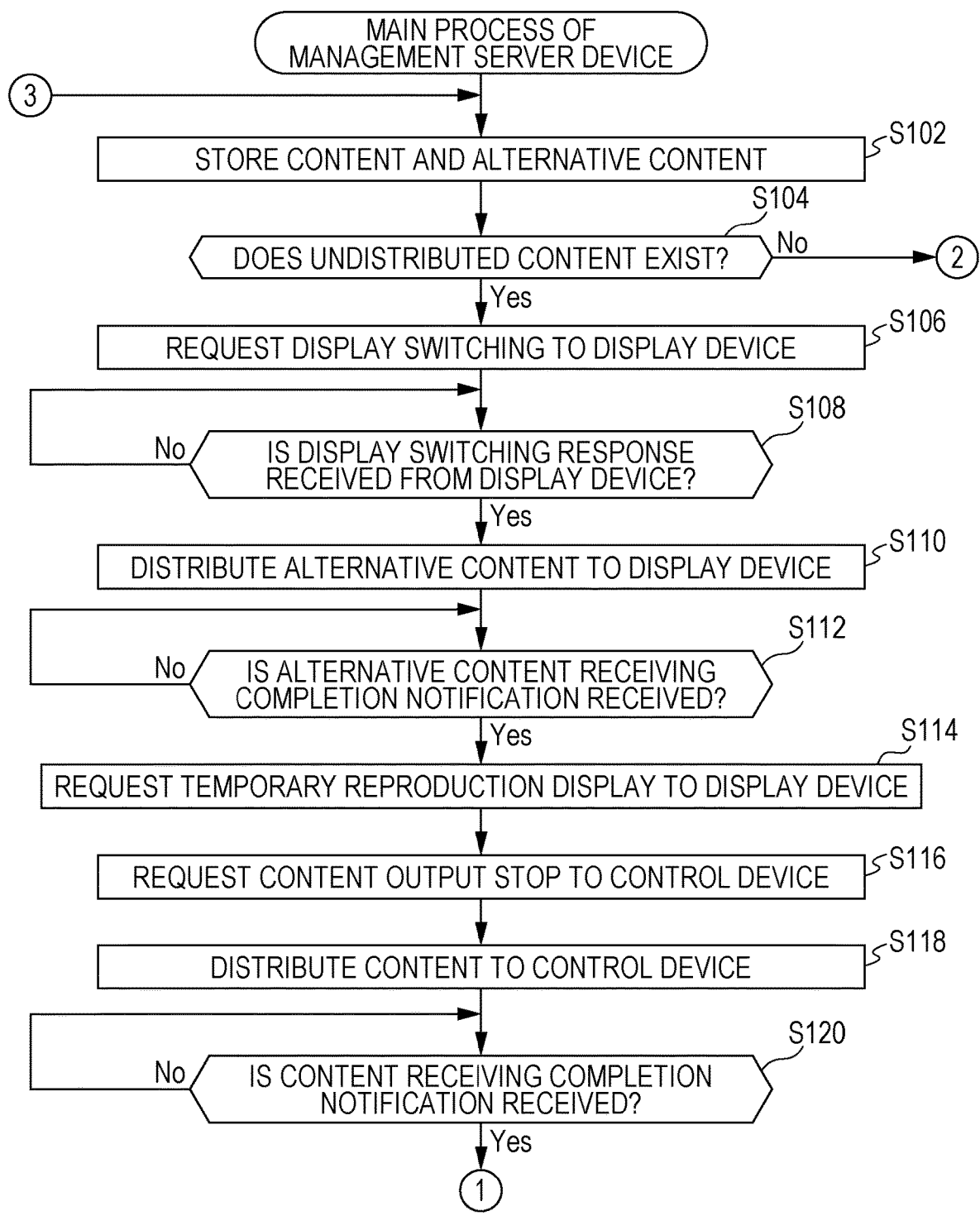
FIG. 7 is an operation flow for explaining a main process of the management server device according to the first embodiment.
Figure 8:
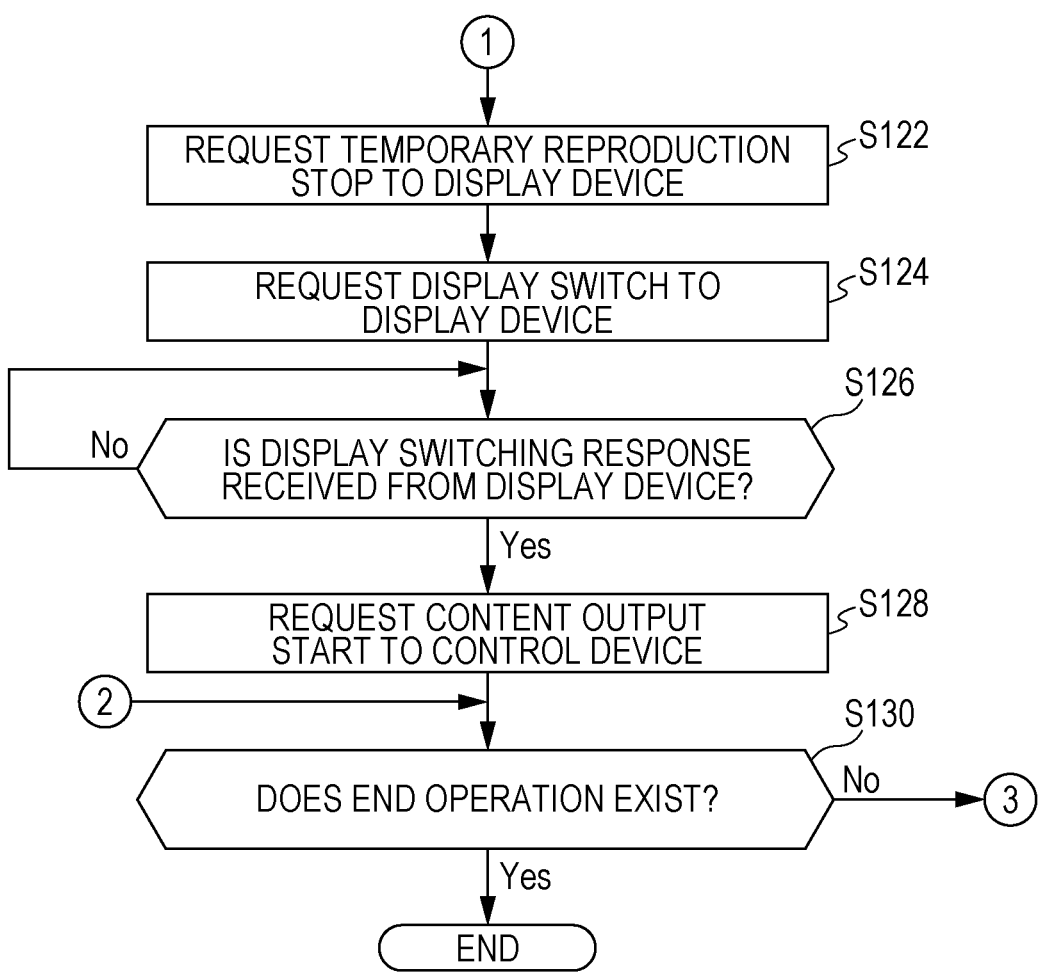
FIG. 8 is an operation flow for explaining the main process of the management server device according to the first embodiment.
Figure 9:
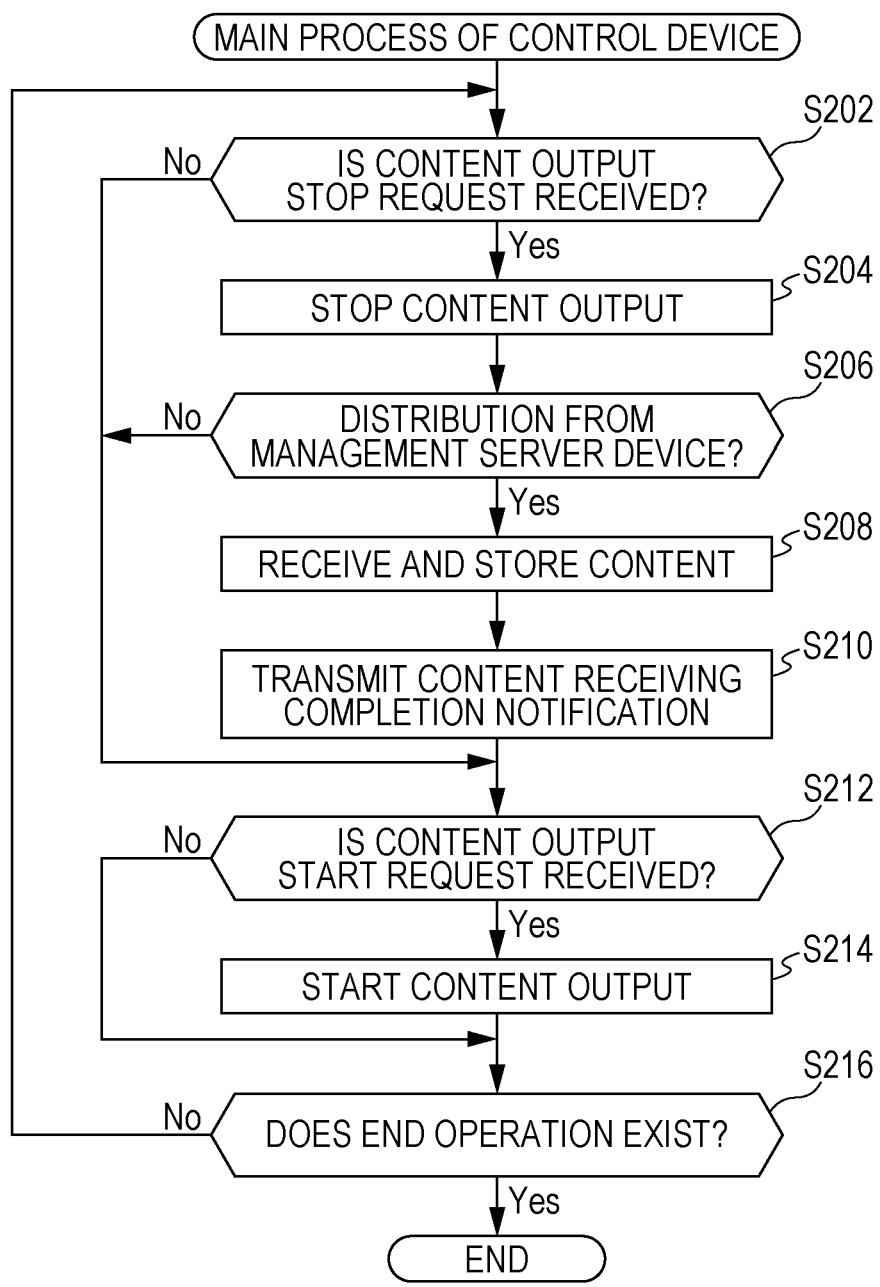
FIG. 9 is an operation flow for explaining a main process of the control device according to the first embodiment.
Figure 10:
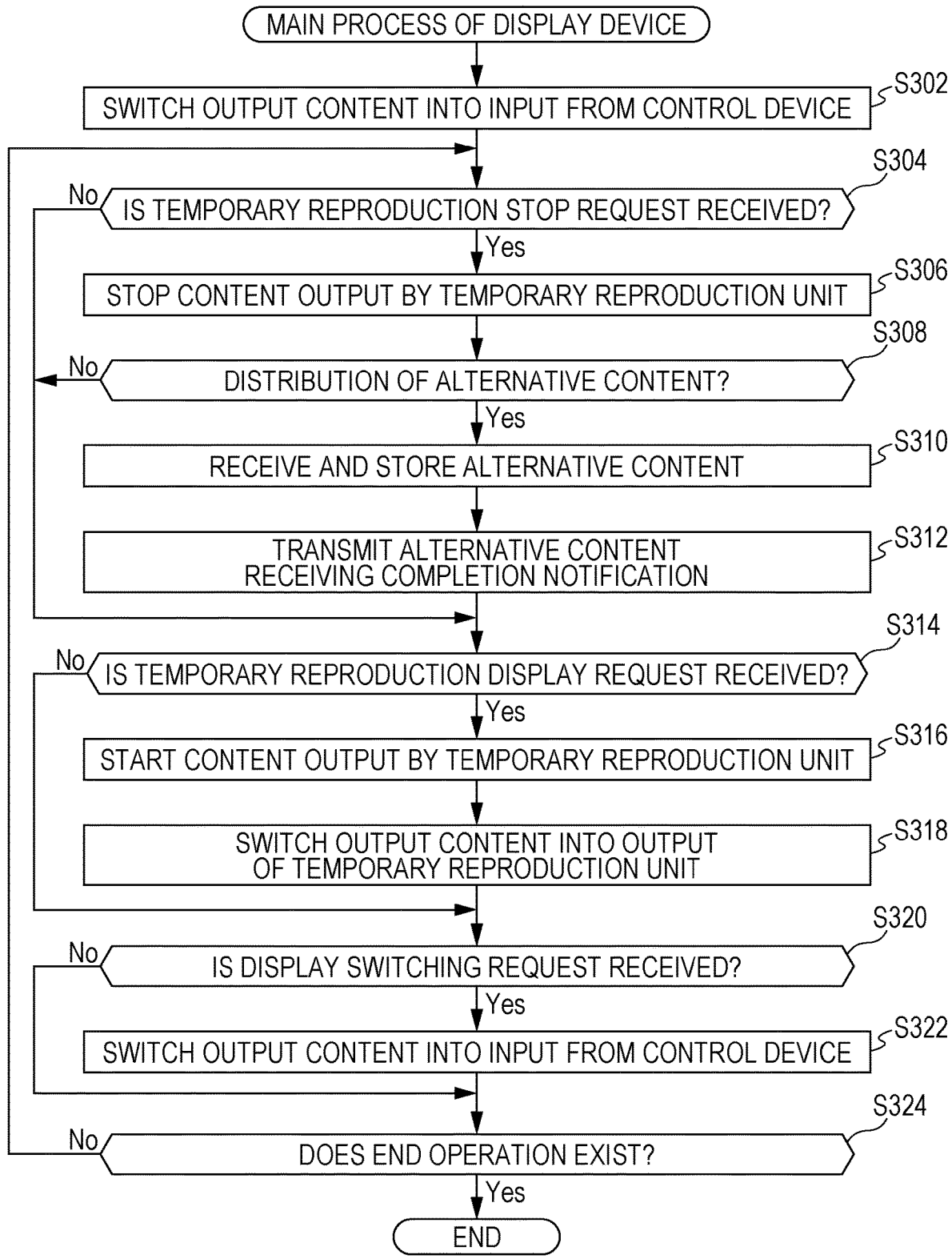
FIG. 10 is an operation flow for explaining a main process of the display device according to the first embodiment.
Figure 11:
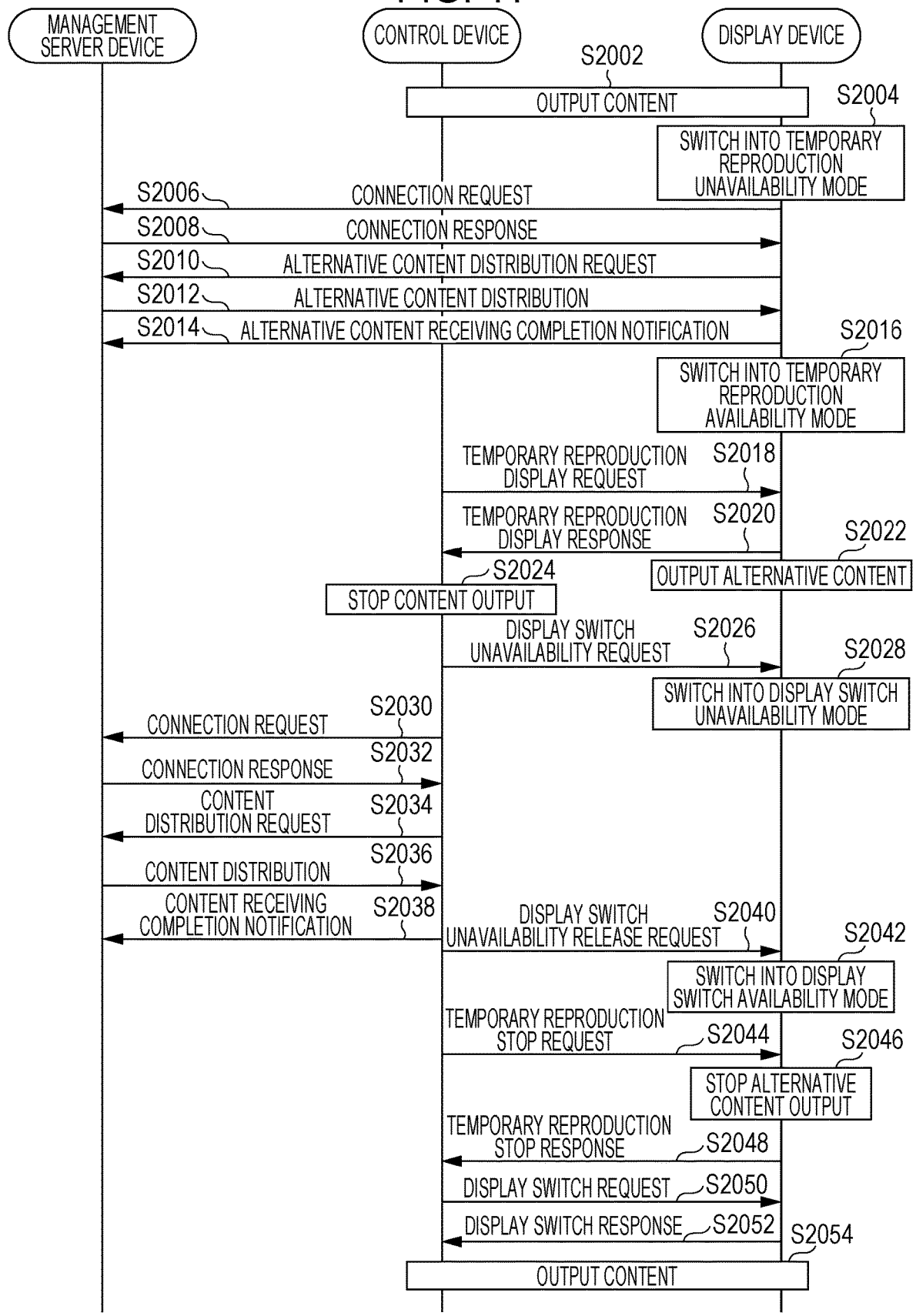
FIG. 11 is a sequence diagram of a management server device, a control device and a display device according to a second embodiment.
Figure 12:
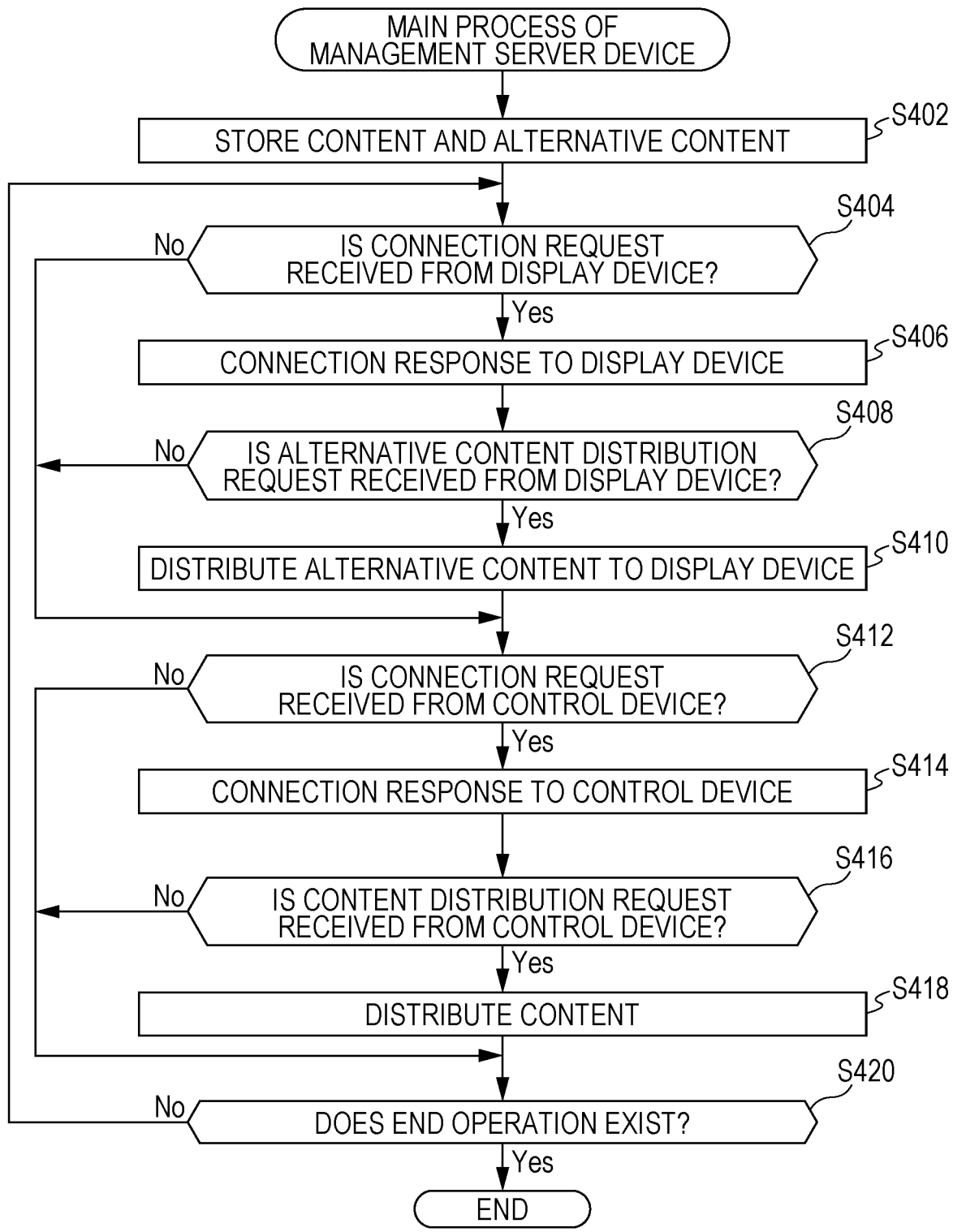
FIG. 12 is an operation flow for explaining a main process of the management server device according to the second embodiment.
Figure 13:
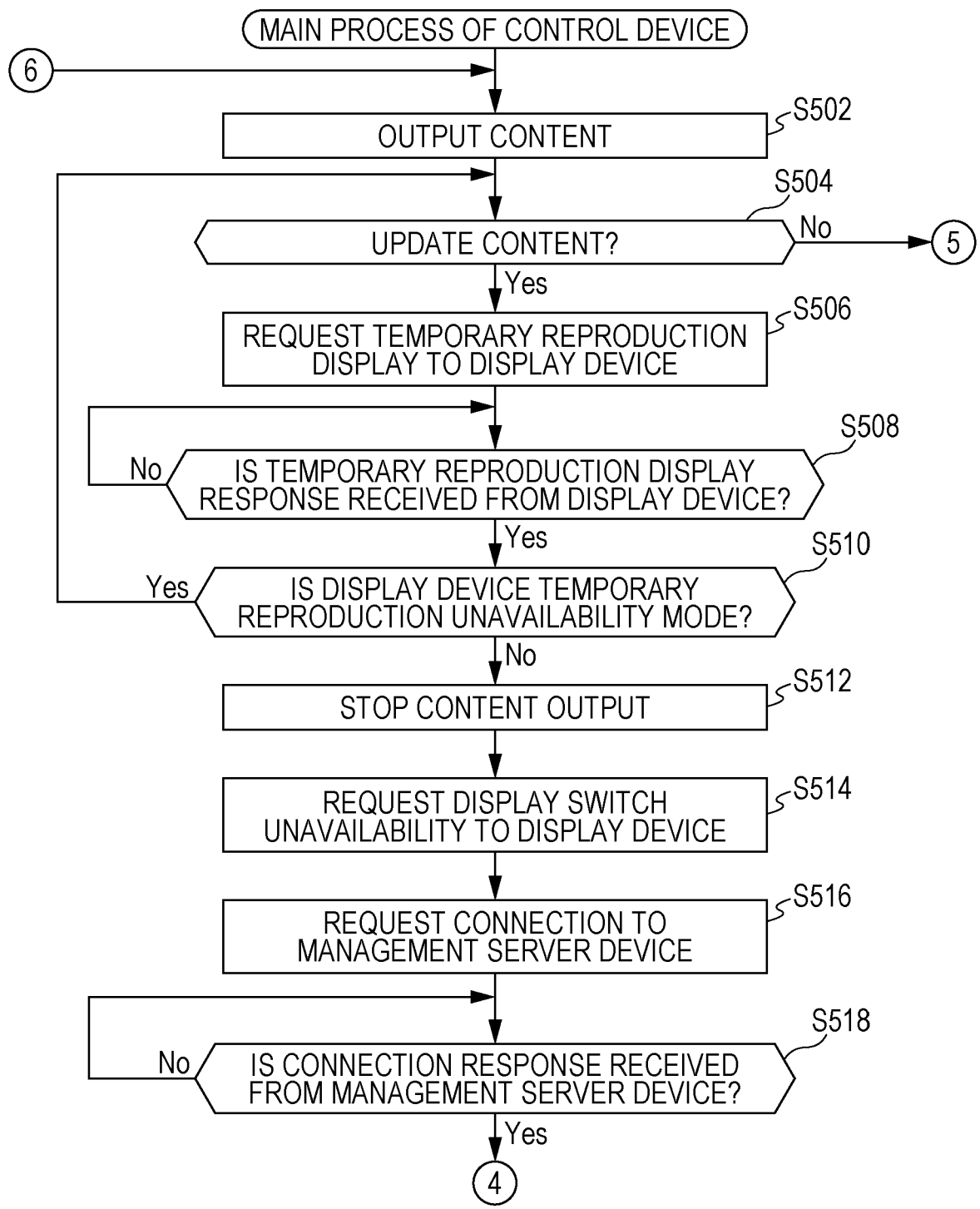
FIG. 13 is an operation flow for explaining a main process of the control device according to the second embodiment.
Figure 14:
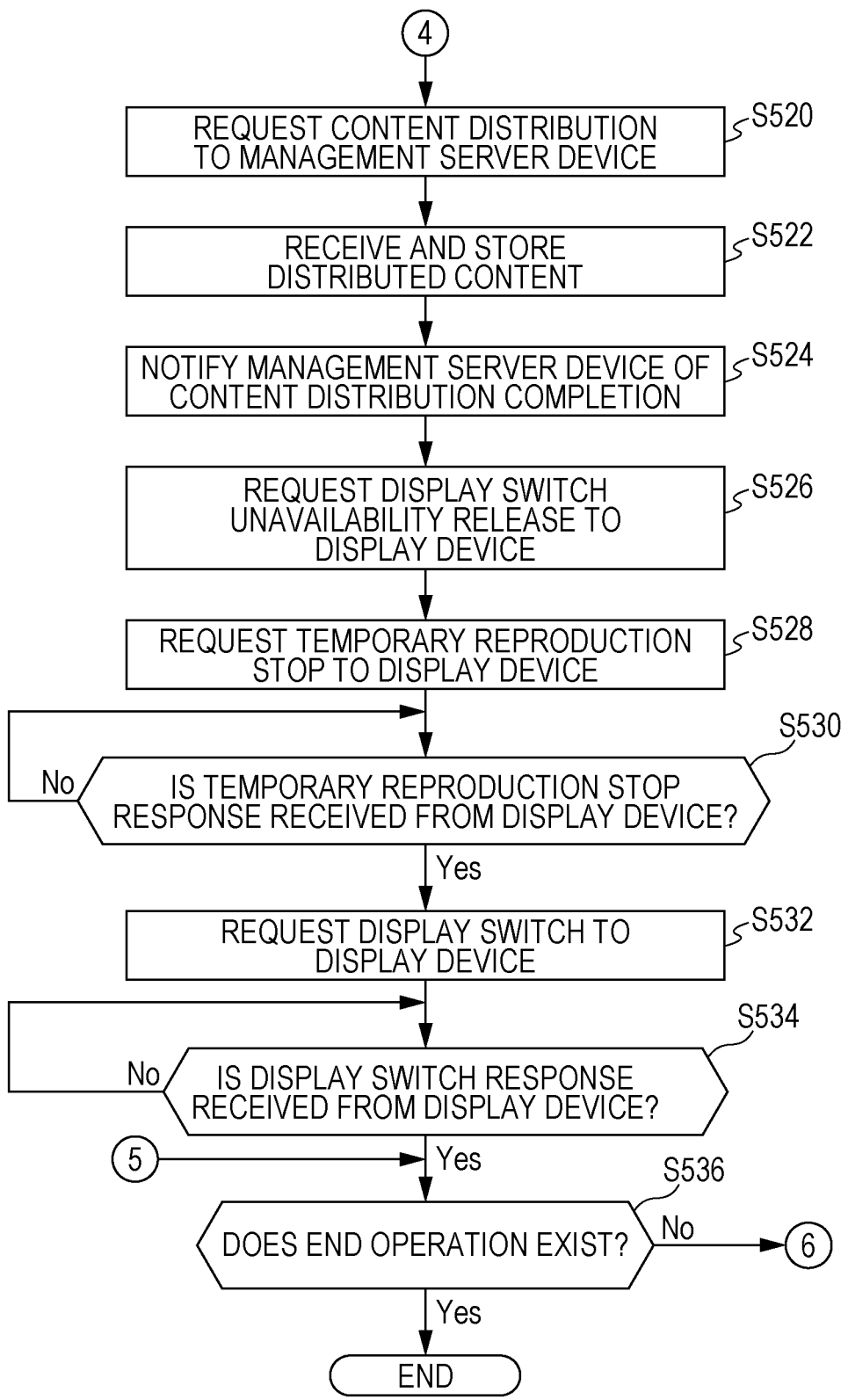
FIG. 14 is an operation flow for explaining the main process of the control device according to the second embodiment.
Figure 15:
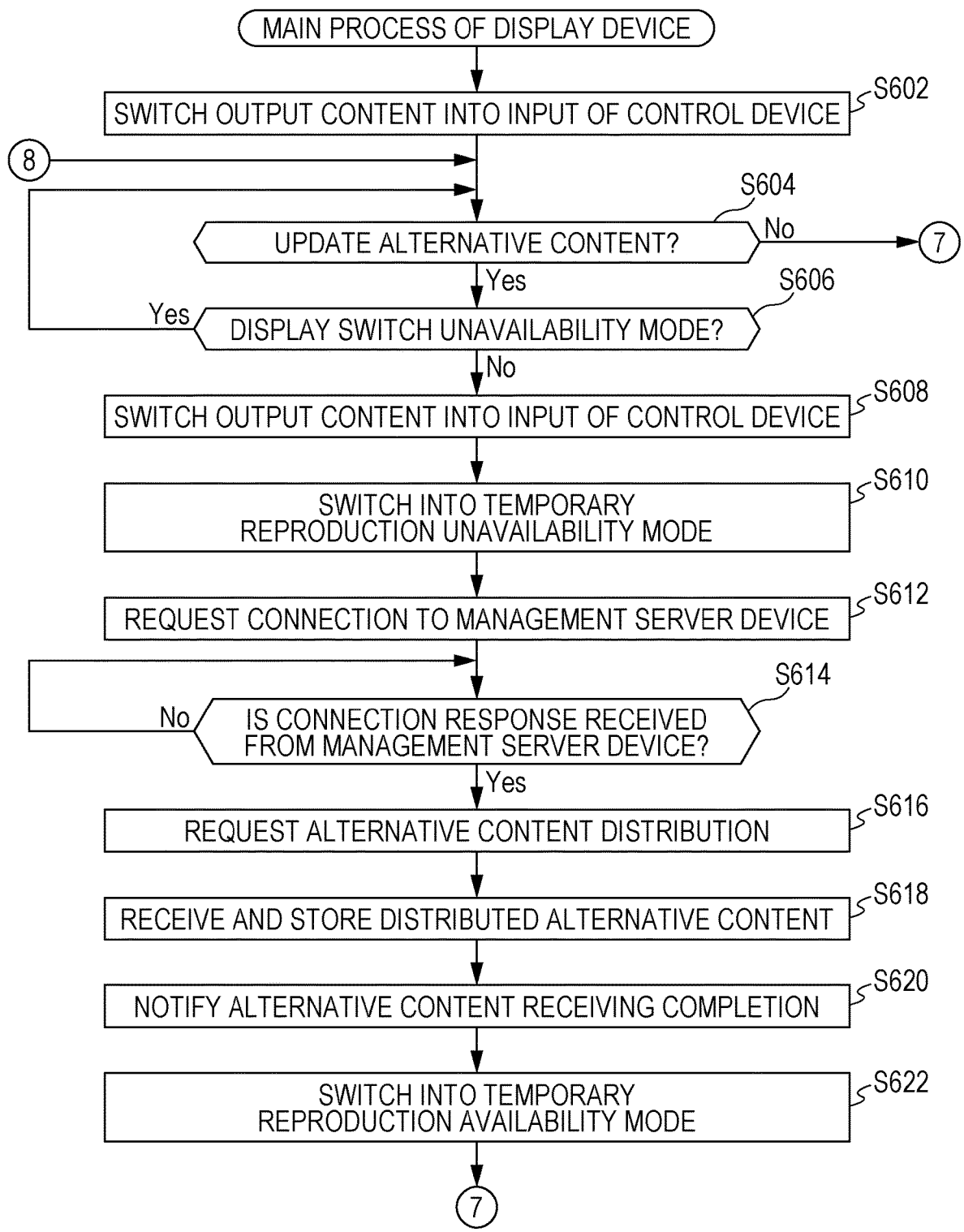
FIG. 15 is an operation flow for explaining a main process of the display device according to the second embodiment.
Figure 16:
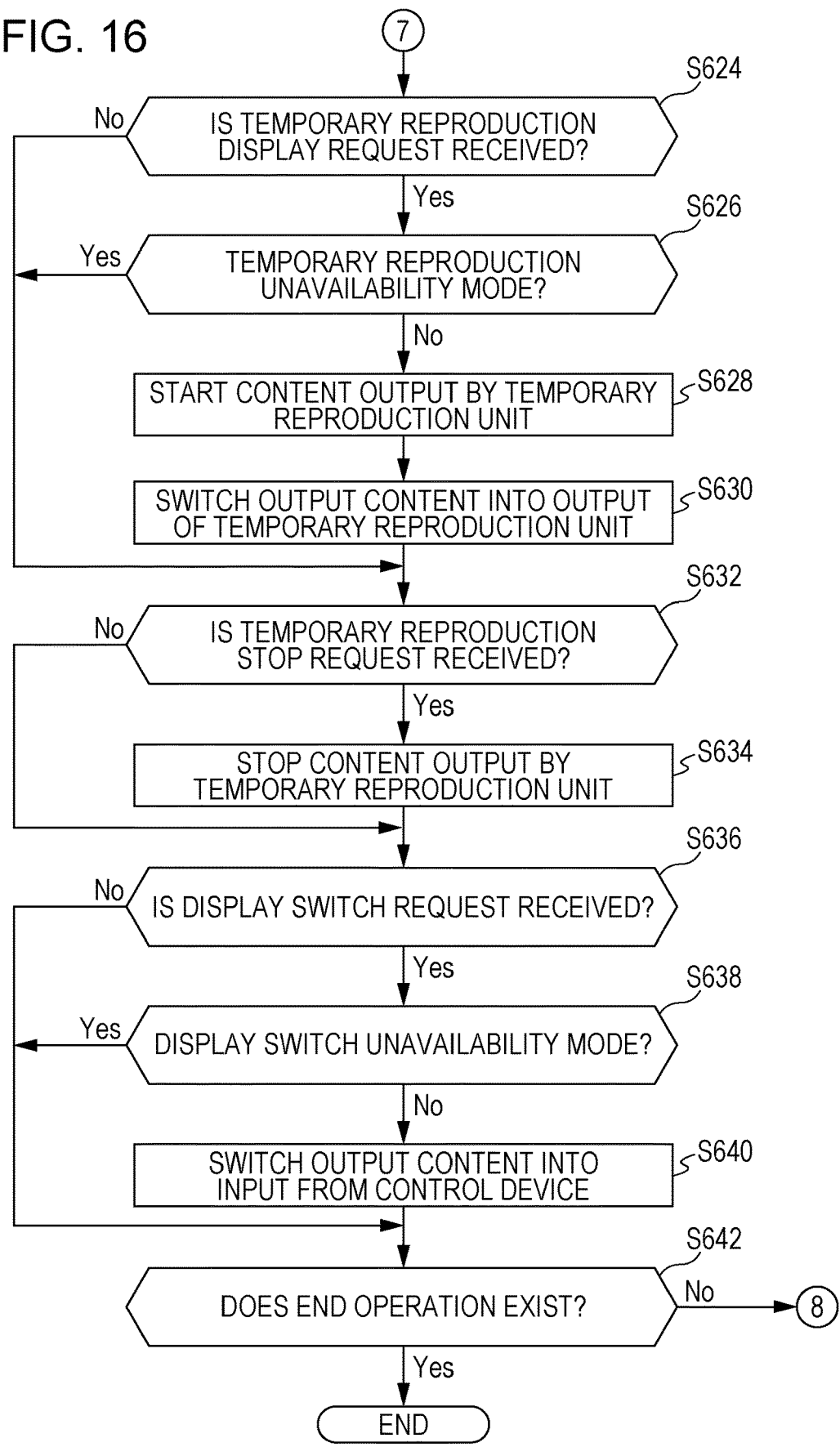
FIG. 16 is an operation flow for explaining the main process of the display device according to the second embodiment.

In the present embodiment, the sequence diagram in FIG. 6 according to the first embodiment is substituted with a sequence diagram in FIG. 11, the processes in FIGS. 7 and 8 are substituted with a process in FIG. 12, the process in FIG. 9 is substituted with processes in FIGS. 13 and 14, and the process in FIG. 10 is substituted with processes in FIGS. 15 and 16. Here, since functional configurations of the management server device 10, the control device 20, and the display device 30 according to the second embodiment is the same as the functional configuration according to the first embodiment, a description of the functional configurations will be omitted.

2.1 Flow of Process
2.1.1 Overall Sequence Diagram

FIG. 11 is a sequence diagram illustrating an overall flow of the management server device 10, the control device 20, and the di play device 30. First, as the content output mode, the display device 30 outputs the content output from the control device 20 (S2002).

In a case of updating the alternative content stored in the alternative content storage region 382, the display device 30 is changed to a temporary reproduction unavailability mode (S2004). The temporary reproduction unavailability mode is a mode in which the temporary reproduction is not performed (that is, alternative content is not output) even if the temporary reproduction display request is received, and the content output mode of performing the output of the content from the control device 20 is maintained.

Next, the display device 30 transmits a connection request to the management server device 10 (S2006) and receives a connection response from the management server device 10 (S2008). By receiving the connection response, the display device 30 may detect that a connection destination of the management server device 10 which is a transmission source of the alternative content is correct.

Next, the display device 30 transmits an alternative content distribution request to the management server device 10 (S2010) and receives the alternative content distributed from the management server device 10 (S2012). When the reception of the alternative content is completed, the display device 30 transmits the alternative content receiving completion notification to the management server device 10 (S2014). As described above, since the alternative content is updated, when the display device 30 receives the temporary reproduction display request, the mode is switched into a temporary reproduction availability mode so that the input switching unit 360 outputs the content output from the temporary reproduction unit 370 (S2016).

Next, the control device 20 updates the content stored in the content storage region 242. At this time, the control device 20 transmits the temporary reproduction display request to the display device 30 so that the display device 30 does not display the content output from the control device 20 (S2018). In addition, the control device 20 receives a temporary reproduction display response transmitted from the display device 30 (S2020).

Accordingly, in the temporary reproduction mode, the display device 30 outputs the alternative content stored in the alternative content storage region 382 (S2022). In addition, since the control device 20 receives the temporary reproduction display response from the display device 30 and detects the temporary reproduction mode, the output of the content is stopped (S2024).

The control device 20 transmits a display switching unavailability request to the display device 30 so that the mode is not changed to the content output mode by the display switching request while the content is updated (S2026). Accordingly, the display device 30 is changed to a display switching unavailability mode (S2028).

Next, the control device 20 transmits the connection request to the management server device 10 (S2030) and receives the connection response from the management server device 10 (S2032). By receiving the connection response, the control device 20 may detect that a connection destination of the management server device 10 which is a transmission source of the content is correct.

Next, the control device 20 transmits a content distribution request to the management server device 10 (S2034) and receives the content distributed from the management server device 10 (S2036). When the reception of the content is completed, the control device 20 transmits the content receiving completion notification to the management server device 10 (S2038). As described above, the control device 20 may update the content. Here, in order to allow the content output mode by the display switching request, a display switching unavailability release request is transmitted to the display device 30 (S2040). Accordingly, the display device 30 is changed to a display switching availability mode (S2042).

Subsequently, the display device 30 is changed to the content output mode. First, the control device 20 transmits a temporary reproduction stop request to the display device 30 (S2044) and stops the function of the temporary reproduction unit 370 (S2046). The control device 20 receives a temporary reproduction stop response transmitted from the display device 30 (S2048). Further, the control device 20 transmits the display switching request to the display device 30 (S2050) and receives the display switching response transmitted from the display device 30 (S2052). According to these processes, the mode is switched into the content output mode (S2054).

2.1.2 Main Process of Management Server Device

A main process of the management server device 10 will be described with reference to FIG. 12. First, the content and the alternative content is stored. The content is stored in the content storage region 132 and the alternative content is stored in the alternative content storage region 134 (step S402).

Next, it is determined whether or not the connection request is received from the display device 30 (step S404). When receiving the connection request, the connection response is transmitted to the display device 30 (Yes in step S404→step S406). In addition, it is determined whether or not the alternative content distribution request is received from the display device 30 (step S408). In a case of receiving the alternative content distribution request, the alternative content is distributed to the display device 30 (Yes in step S408→step S410).

Next, it is determined whether or not the connection request is received from the control device 20 (step S412). When receiving the connection request, the connection response is transmitted to the control device 20 (Yes in step S412→step S414). In addition, it is determined whether or not the content distribution request is received from the control device 20 (step S416). In a case of receiving the content distribution request, the content is distributed to the control device 20 (Yes in step S416→step S410).

Next, it is determined whether or not the end operation is performed (step S420). In a case of the end operation, the process is ended (Yes in step S420). In a case where the end operation is not performed, the process returns to step S404 (No in step S420→step S404).

2.1.3 Main Process of Control Device

A main process of the control device 20 will be described with reference to FIGS. 13 and 14. First, the content is output (step S502). That is, the control device 20 reads the content from the content storage region 242 and outputs the content.

Next, it is determined whether to update the content (step S504). For example, in a case of regularly updating the content such as updating every day at 3 am, whether to update the content may be determined depending on whether or not it is a prescribed time. Further, for example, whether to update the content may be determined based on the presence or absence of an instruction by an operator or a combination of instructions by the operator.

In a case of updating the content, the temporary reproduction display request is transmitted to the display device 30 (step S506). Next, it is determined whether or not the temporary reproduction display response is received from the display device 30 (step S508).

When receiving the temporary reproduction display response, it is determined whether or not the display device 30 is at the temporary reproduction unavailability mode (Yes in step S508→step S510). Whether or not the display device 30 is at the temporary reproduction unavailability mode is determined by transmitting a signal for enquiring whether the display device 30 is at the temporary reproduction unavailability mode of the display device 30 and receiving a response to the signal or by the temporary reproduction display response received in step S508. For example, the temporary reproduction display response including a flag indicating whether or not the display device 30 is at the temporary reproduction unavailability mode may be transmitted to the control device 20 and the control device 20 may determine whether or not the display device 30 is at the temporary reproduction unavailability mode based on the flag.

In a case where the display device 30 is not at the temporary reproduction unavailability mode, by receiving a response to the temporary reproduction display request, the control device 20 may detect that the display device 30 is at the temporary reproduction mode. Next, the control device 20 stops the output of the content (step S512) and transmits the display switching unavailability request to the display device 30 (step S514).

Next, the connection request is transmitted to the management server device 10 (step S516). It is determined whether or not the connection response is received from the management server device 10 (step S518). In a case of receiving the connection response from the management server device 10, the content distribution request is transmitted to the management server device 10 (Yes in step S518→step S520 in FIG. 14).

Next, the content distributed from the management server device 10 is received and is stored in the content storage region 242 (step S522). When the reception of the content is completed, a content distribution completion notification is transmitted to the management server device 10 (step S524). As described above, the update of the content stored in the content storage region 242 of the control device 20 is completed.

When the update of the content is completed, in order to notify the display device 30 that the reception of the content from the control device 20 becomes possible, the display switching unavailability release request is transmitted to the display device 30 (step S526).

Subsequently, the display device 30 is changed to the content output mode. First, the temporary reproduction stop request is transmitted to the display device 30 and the output of the alternative content is stopped (step S528). It is determined whether or not the temporary reproduction stop response to the temporary reproduction stop request is received from the display device 30 (step S530). In a case of receiving the temporary reproduction stop response, the display switching request is transmitted to the display device 30 (Yes in step S530→step S532). Next, it is determined whether or not the display switching response is received from the display device 30 (step S534). When receiving the display switching response (Yes in step S534), the control device 20 may detect that the display device 30 is at the content output mode.

Next, it is determined whether or not the end operation is performed (step S536). In a case of the end operation, the process is ended (Yes in step S536). In a case where the end operation is not performed, the process returns to step S502 (No in step S536→step S502 in FIG. 13).

2.1.4 Main Process of Display Device

A main process of the display device 30 will be described with reference to FIGS. 15 and 16. First, in order to set the content output mode, the input switching unit 360 is controlled (step S602). In a case where the display device 30 is already at the content output mode, the input switching unit 360 may be not controlled.

Next, it is determined whether to update the alternative content (step S604). For example, whether to update the alternative content may be determined based on the presence or absence of an instruction by the operator. In a case of regularly updating the alternative content, whether to update the alternative content may be determined based on whether or not it is a prescribed time.

Next, it is determined whether or not the display device 30 is at the display switching unavailability mode (step S606). In a case of the display switching unavailability mode, the content output mode may not be set. Therefore, in this case, instead of updating the alternative content, the process returns to step S604 (No in step S606→step S604).

When updating the alternative content, in order to set the content output mode, the input switching unit 360 is controlled to switch the content to be output into the content output from the control device 20 (step S608). In a case where the display device 30 is already at the content output mode, the input switching unit 360 may be not controlled.

Next, the mode is changed to the temporary reproduction unavailability mode (step S610) and the temporary reproduction mode is unavailable. In this way, it is possible to avoid the control device 20 from updating the content while the display device 30 updates the alternative content.

Next, the connection request is transmitted to the management server device 10 (step S612). It is determined whether or not the connection response is received from the management server device 10 (step S614). In a case of receiving the connection response from the management server device 10, the alternative content distribution request is transmitted to the management server device 10 (Yes in step S614→step S616).

Next, the alternative content distributed from the management server device 10 is received and is stored in the alternative content storage region 382 (step S618). When the reception of the alternative content is completed, an alternative content distribution completion notification is transmitted to the management server device 10 (step S620). As described above, the update of the alternative content stored in the alternative content storage region 382 of the display device 30 is completed.

Since the temporary reproduction mode may be set when the update of the alternative content is completed, the mode is changed to the temporary reproduction availability mode (step S622).

Next, it is determined whether or not the temporary reproduction display request is received (step S624 in FIG. 16). When receiving the temporary reproduction display request, it is determined whether or not the display device 30 is at the temporary reproduction unavailability mode (Yes in step S624→step S626). In a case where the display device 30 is not at the temporary reproduction unavailability mode (No in step S626), the temporary reproduction unit 370 starts outputting the content (step S628) and controls the input switching unit 360 to set the temporary reproduction mode (step S630).

Next, it is determined whether or not the temporary reproduction stop request is received (step S632). When receiving the temporary reproduction display request, the output of the content by the temporary reproduction unit 370 is stopped (step S634).

Next, it is determined whether or not the display switching request is received (step S636). When receiving the display switching request, it is determined whether or not the display device 30 is at the display switching unavailability mode (Yes in step S636→step S638). In a case where the display device 30 is not at the display switching unavailability mode (No in step S638), the temporary reproduction unit 370 starts outputting the content (step S628) and controls the input switching unit 360 to set the content output mode (step S640).

Next, it is determined whether or not the end operation is performed (step S642). In a case of the end operation, the process is ended (Yes in step S642). In a case where the end operation is not performed, the process returns to step S604 (No in step S642→step S604).

In this way, in the present embodiment, according to the requests from the control device 20 and the display device 30, in a case where receiving the content and the alternative content from the management server device 10, it is possible to receive the content by avoiding the state in which the device which receives the content displays the content. As a result, even in a so-called PULL type content distribution system, the content and the alternative content may be received without affecting the output of the content.

3. Third Embodiment

Figure 17:
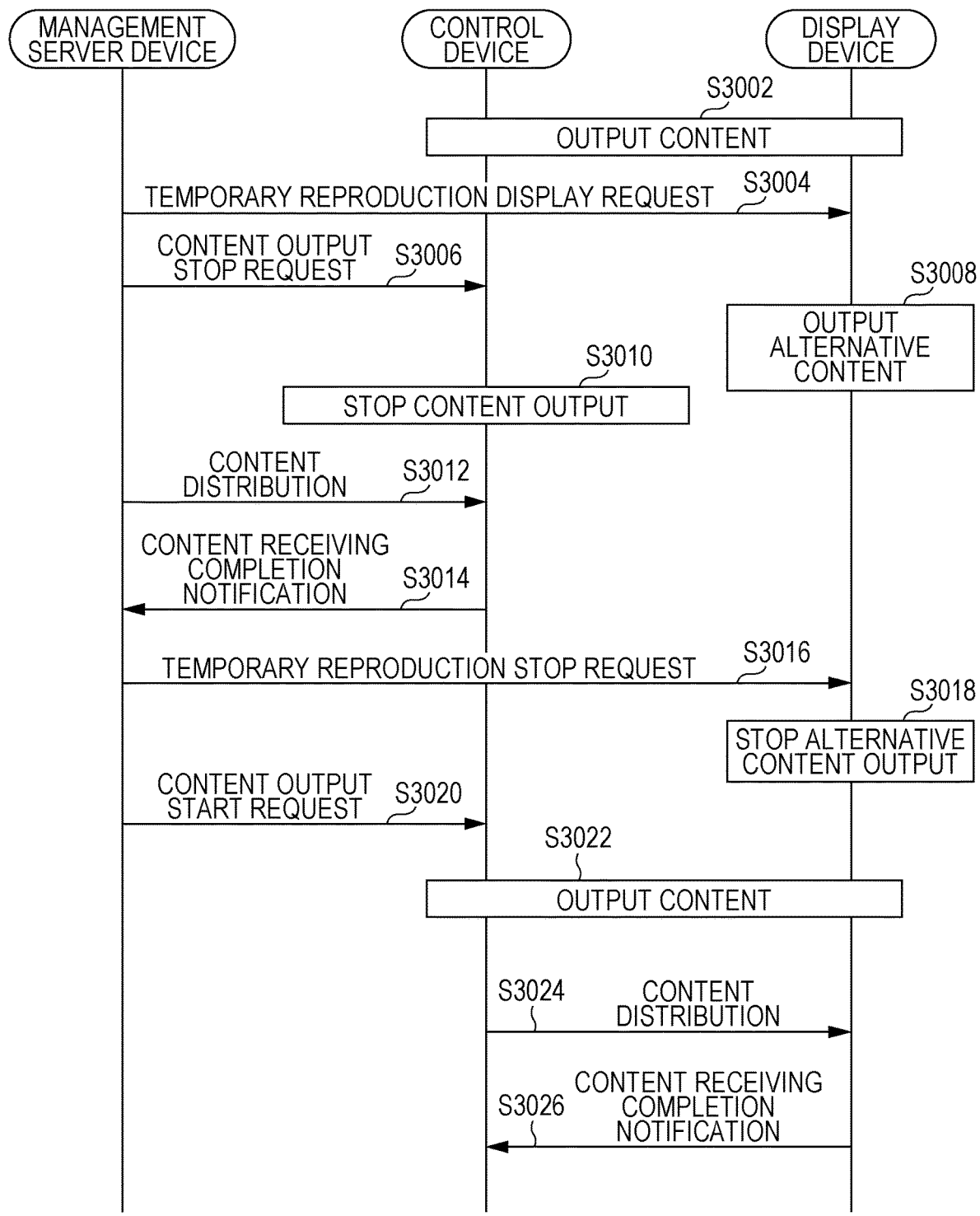
FIG. 17 is a sequence diagram of a management server device, a control device, and a display device according to a third embodiment.

Next, the third embodiment will be described with reference to FIG. 17. The third embodiment has the same configuration as the first embodiment, but the third embodiment has a different method of distributing the content. In the third embodiment, the management server device 10 distributes the content to the control device 20 and the control device 20 distributes the content to the display device 30.

First, as the content output mode, the display device 30 outputs the content input from the control device 20 (S3002).

In a case of updating the content stored in the content storage region 242, the management server device 10 transmits the temporary reproduction display request to the display device 30 (S3004) and transmits the content output stop request to the control device 20 (S3006). Accordingly, the input switching unit 360 switches the input to the alternative content, so that the display device 30 starts outputting the alternative content (S3008). In addition, the control device 20 stops outputting the content (S3010). According to these processes, the temporary reproduction mode is set.

Next, in order to update the content stored in the content storage region 242 of the control device 20, the management server device 10 distributes the content to the control device 20 (S3012). In addition, when the reception of the content is completed, the control device 20 transmits the content receiving completion notification to the management server device 10 (S3014).

Next, in order to set the content output mode, the management server device 10 transmits the temporary reproduction stop request to the display device 30 (S3016) and stops the output of the alternative content (S3018). In addition, the management server device 10 transmits the content output start request to the control device 20 (S3020) and controls the control device 20 to output the content. Accordingly, the mode is changed to the content output mode (S3022).

Next, the control device 20 distributes the content to the display device 30 (step S3024). In a case where the reception of the content is completed, the display device 30 transmits the content receiving completion notification to the control device 20 (S3026). Accordingly, the content stored in the display device 30 is updated.

The content distributed from the management server device 10 to the control device 20 may include the alternative content and the alternative content may be distributed from the control device 20 to the display device 30. In addition, based on the content distributed from the management server device 10 to the control device 20, the control device 20 may generate the alternative content and may distribute the generated alternative content to the display device 30.

In this way, according to the present embodiment, while the control device 20 receives the content from the management server device 10 which is the content management server, the temporary reproduction unit 370 displays the alternative content on the display device 30. In addition, while the content is received from the control device 20, the display device 30 outputs the content output from the control device 20. Accordingly, while the content is received, it is possible to avoid an occurrence of a malfunction such as a distortion in the video displayed on the display device 30.

4. Fourth Embodiment

Next, the fourth embodiment will be described. The fourth embodiment has the approximately same configuration and processes as the third embodiment, but the fourth embodiment has a different method of distributing the content from the control device 20 to the display device 30. That is, the third embodiment has a PUSH distribution of transmitting the content from the control device 20 to the display device 30, but the fourth embodiment has a PULL distribution of transmitting the content distribution request to the control device 20 when the display device 30 updates the content.

Figure 18:
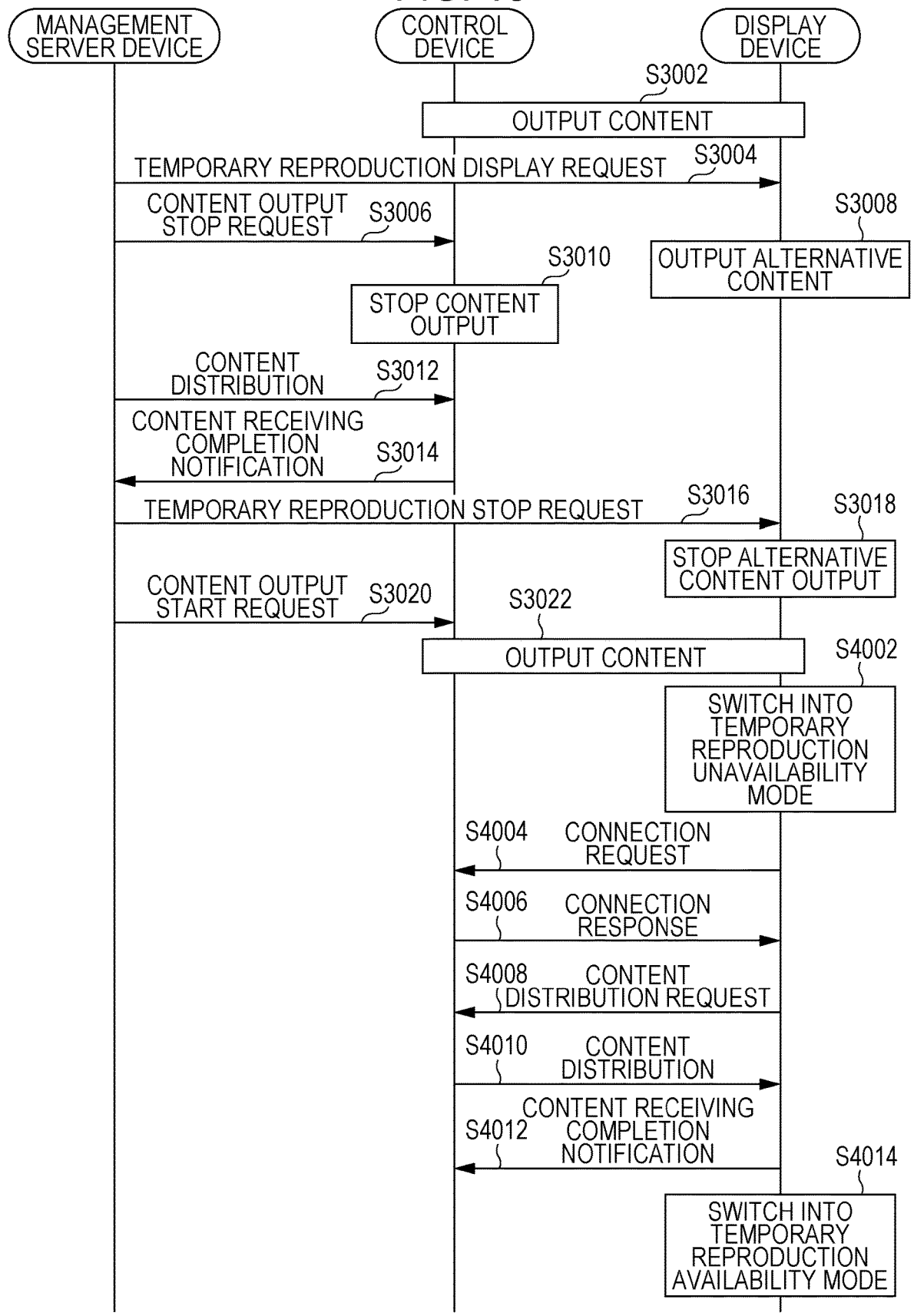
FIG. 18 is a sequence diagram of a management server device, a control device, and a display device according to a fourth embodiment.

FIG. 18 is a sequence diagram illustrating a process of the present embodiment. FIG. 18 is a diagram in which S3024 and S3026 in the sequence diagram of FIG. 17 are substituted with S4002 to S4014. Since the processes up to S3022 are the same as the third embodiment, a description thereof will be omitted.

In the present embodiment, the alternative content desired to the display device is distributed to the control device. That is, in S3012, the content is distributed from the management server device 10 to the control device 20, but it is assumed that the content includes the alternative content.

In addition, the control device 20 may generate the alternative content from the content. For example, the alternative content of a reduced bit rate may be generated from the content in the control device 20 or the alternative content may be generated based on the alternative content of a still image In a case of creating the alternative content, the alternative content may be prepared in advance or may be generated after a request.

That is, in any case, the alternative content may be prepared on a control device 20 side. In a state in which the alternative content is prepared in the control device 20 or may be prepared in the control device 20, the display device 30 is changed to the temporary reproduction unavailability mode (S4002). Next, the display device 30 transmits the connection request to the control device 20 (S4004) and receives the connection response from the control device 20 (S4006). By receiving the connection response, the display device 30 may detect that a connection destination of the control device 20 which is a transmission source of the content is correct.

Next, the display device 30 transmits the content distribution request to the control device 20 (S4008) and receives the content distributed from the control device 20 (S401)). When the reception of the content is completed, the display device 30 transmits the content receiving completion notification to the control device 20 (S4012). As described above, since the alternative content is updated, when the display device 30 receives the temporary reproduction display request, the mode is switched into a temporary reproduction availability mode so that the input switching unit 360 outputs the content output from the temporary reproduction unit 370 (S4014).

In this way, according to the present embodiment, while the control device 20 receives the content from the management server device 10 which is the content management server, the temporary reproduction unit 370 displays the alternative content on the di play device 30. In addition, the display device 30 is a so-called PULL type content distribution system, but while the content is received from the control device 20, the display device 30 outputs the content output from the control device 20. Accordingly, while the control device 20 and the display device 30 receive the content, it is possible to avoid an occurrence of a malfunction such as a distortion in the video displayed on the display device 30.

5. Fifth Embodiment

Next, the fifth embodiment will be described with reference to FIG. 19. The fifth embodiment has the same configuration as the first embodiment, but the fifth embodiment has a different method of distributing the content. That is, by using the PULL distribution, the management server device 10 distributes the content to the control device 20 and the control device 20 distributes the content to the display device 30. That is, the control device 20 updates the alternative content as a main unit.

First, as the content output mode, the display device 30 outputs the content received from the control device 20 (S5002). Next, the control device 20 transmits the temporary reproduction display request to the display device 30 (S5004) and the display device 30 transmits the temporary reproduction display response to the control device 20 (S5006). The display device 30 is changed to the temporary reproduction mode, so that the display device 30 starts outputting the alternative content (S5008). In addition, the control device 20 stops outputting the content (S5010).

Next, the control device 20 transmits the connection request to the management server device 10 (S5012). When receiving the connection response from the management server device 10 (S5014), the control device 20 transmits the content distribution request (S5016) and receives the content distributed from the management server device 10 (S5018). When the reception of the content is completed, the control device 20 transmits the content receiving completion notification to the management server device 10 (S5020). As described above, the control device 20 may update the content.

The alternative content is included in the content or the control device 20 generates the alternative content from the content. Since a method of the control device 20 generating the alternative content is the same as the method described in the fourth embodiment, a description thereof will be omitted.

Next, since the alternative content of the display device 30 is updated, the temporary reproduction mode is switched into the content output mode. Specifically, the control device 20 transmits the temporary reproduction stop request to the display device 30 (S5022) and stops the output of the alternative content (S5024). In addition, the control device 20 transmits the display switching request to the display device 30 (S5026) and controls the control device 20 to output the content. When the control device 20 receives the display switching response from the display device 30 (S5028), the control device 20 is changed to the content output mode (S5030).

Next, when the display device 30 stops the output of the alternative content, the control device 20 distributes the prepared alternative content to the display device 30

(S5032). When the reception of the alternative content is completed, the display device 30 transmits the content receiving completion notification to the control device 20 (S5034). As described above, the display device 30 may update the alternative content.

The content is distributed from the control device 20 to the display device 30 by using the PUSH distribution, but the content may be distributed by using the PULL distribution. In this case, when the processes in S5032 and S5034 are substituted with the processes in S4002 to S4014 in FIG. 18, the PULL distribution may be realized.

In this way, according to the present embodiment, without transmitting a control signal which is the temporary reproduction display request or the content output start request to the control device 20 or the display device 30, the management server device 10 may distribute the content to the control device 20 according to the content distribution request of the control device 20. In the present embodiment, the management server device 10 is highly independent from the control device 20 and the display device 30 and is preferable at the viewpoint of security.

6. Sixth Embodiment

Operations of the control device 20 and the display device 30 according to the sixth embodiment will be described.

In the sixth embodiment, the display device 30 transmits a request to enquire a state of the control device 20. The control device 20 transmits a self-monitoring, analysis, and reporting technology (S.M.A.R.T) value or a report on a temperature, a memory usage, and a usage of a swap area of the control device 20, to the display device 30 for the request.

At this time, in a case where the display device 30 determines that an error occurs in the control device 20 based on the S.M.A.R.T value or the report received from the control device 20, the display device 30 is changed to the temporary reproduction mode. In addition, even in a case where the display device 30 does not receive the response to the request of enquiring the state from the control device 20, the display device 30 is changed to the temporary reproduction mode.

The request of enquiring the state may be regularly transmitted or may be transmitted according to an instruction of the operator or a combination of instructions of the operator. In addition, the request of enquiring the state may be separately transmitted by dividing the requests by a content or a frequency so that communication confirmation with the control device 20 is performed every second and the report is transmitted every one minute.

In a case where it is determined that an error does not occur in the control device 20, for example, as described in the sequence of the fifth embodiment, the content may be distributed or may be output.

In this way, according to the present embodiment, in a case where an error occurs in the control device 20, the control device 20 may be automatically change to the temporary reproduction mode. Accordingly, it possible to avoid a broadcast accident in the display system.

7. Effect

According to the content distribution system describe above, in a case of updating the content of each of the devices, when updating the content, the content is not output. Therefore, the content can be updated while a display quality of the content is maintained.

In the related art, in order to maintain the display quality of the content in a case of updating the content, an operation is performed. For example, within a time zone (non-business hours) during which the content is not displayed, the content is distributed. However, since the period for distributing the content is limited, there is a possibility of causing another problem such as network congestion. In addition, since a 24-hour place displays the content all the time, by distributing the content in a time zone during which customers in the shop are few, an influence is reduced even if a malfunction occurs. However, deterioration of the display quality is inevitable.

Further, in a case where the distribution may not be avoided by the operation, such as when content is urgently distributed, the content is distributed after recognizing that there is a possibility of a malfunction. In addition, there is another possibility of causing a malfunction at the time of inspecting the display device or when an error occurs in the display device.

By using the content distribution system of the embodiment described above, even if the content is updated, the device which updates the content may output the content at an appropriate state instead of a state in which the content is not certainly output.

8. Modification

The present embodiments are described above with reference to the drawings, but a specific configuration is not limited to the embodiments and may be implemented in various modes without departing from a gist thereof.

In addition, in the embodiment, the program operated in each of the units is a program (program which causes a computer to function) which controls CPU or the like to realize functions of the embodiment described above. The information used by these units is temporarily stored in a temporary storage device (for example, RAM) during the process, thereafter is stored in a storage device such as various ROMs or HDDs and an SSD, and as necessary, the CPU is read and correction and writing are performed.

In addition, in a case of distributing the program to a market, the program can be stored in a portable recording medium and distributed or can be transferred to a server computer connected via a network such as the internet. In this case, the present embodiment also includes the storage device of the server computer.

The present disclosure contains subject matter related to that disclosed in Japanese Priority Patent Application JP 2017-161405 filed in the Japan Patent Office on Aug. 24, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A content distribution system comprising:
   a server that distributes a content;
   a display capable of displaying the content; and
   a display controller that controls display of the content received from the server on the display, wherein the server
- transmits a display request to the display in a case of distributing the content to the display controller, and
- distributes the content to the display controller after transmitting the display request, and the display
- stores an alternative content to be displayed instead of the content, and
- displays the alternative content in a case of receiving the display request from the server.

2. The content distribution system according to claim 1, wherein
in a case of receiving a content to be distributed from the server, the display controller receives the content to be distributed after stopping output of the content.

3. The content distribution system according to claim 1, wherein
the controller of the server also distributes a display schedule of the content, and
the display controller outputs the content to the display according to the display schedule received from the server.

4. The content distribution system according to claim 1, wherein
in a case where the reception of the content is completed, the display controller transmits a completion notification to the server and the controller of the server outputs the content, to the display,
in a case of receiving the completion notification from the display controller, the controller of the server transmits a display stop request to the display, and
in a case of receiving the display stop request, the controller of the display stops displaying the alternative content and displays the content.

5. A content distribution system comprising:
a server that distributes a content;
a display capable of displaying the content; and
a display controller that controls display of the content received from the server on the display, wherein
the display controller
- transmits a display request to the display in a case of receiving the content from the server, and
- receives the content from the server after transmitting the display request, and the display
- stores an alternative content to be displayed instead of the content, and
- displays the alternative content in a case of receiving the display request from the display controller.

6. The content distribution system according to claim 5, wherein
in a case where the reception of the content is completed, the display controller transmits a completion notification to the server and the server transmits a display stop request to the display, and
in a case of receiving the display stop request, the display stops displaying the alternative content and displays the content.

* * * * *